United States Patent
Lazaro

(10) Patent No.: US 7,824,133 B1
(45) Date of Patent: Nov. 2, 2010

(54) ARTIFICIAL GROUND COVER AND SYSTEM OF INSTALLATION

(76) Inventor: Joseph Lazaro, P.O. Box 972, Jerome, AZ (US) 86331

( * ) Notice: Subject to any disclaimer, the term of this patent is extended or adjusted under 35 U.S.C. 154(b) by 1253 days.

(21) Appl. No.: 11/385,283

(22) Filed: Mar. 21, 2006

Related U.S. Application Data

(60) Provisional application No. 60/664,618, filed on Mar. 22, 2005.

(51) Int. Cl.
    *E02D 17/20* (2006.01)
(52) U.S. Cl. .................. 405/302.7; 405/303
(58) Field of Classification Search .......... 405/302.4, 405/302.5, 302.7, 303; 414/24.6
    See application file for complete search history.

(56) References Cited

U.S. PATENT DOCUMENTS

| | | | | |
|---|---|---|---|---|
| 5,536,116 A | * | 7/1996 | Lammers et al. | 405/129.9 |
| 5,620,281 A | * | 4/1997 | Lammers et al. | 405/129.9 |
| 5,697,452 A | * | 12/1997 | Link | 172/19 |
| 6,131,668 A | * | 10/2000 | Houska | 172/253 |
| 6,171,022 B1 | * | 1/2001 | Decker | 405/16 |
| 6,264,400 B1 | * | 7/2001 | Gent | 405/129.75 |
| 6,267,535 B1 | * | 7/2001 | Brauer et al. | 405/129.9 |
| 6,663,324 B2 | * | 12/2003 | Nordloh | 405/302.6 |
| 7,188,447 B2 | * | 3/2007 | Rose et al. | 47/32.2 |
| 2003/0072622 A1 | * | 4/2003 | McPhillips | 405/302.7 |
| 2003/0198522 A1 | * | 10/2003 | Nordloh | 405/302.7 |

* cited by examiner

*Primary Examiner*—Tara Mayo-Pinnock
(74) *Attorney, Agent, or Firm*—Gregory J. Nelson

(57) ABSTRACT

A ground cover in the form of a flexible substrate defining a plurality of compactly arranged extractable sections. The installation method involves passing the substrate material from a feed roll to an extraction site on a mobile installation apparatus. A plurality of drive pins are aligned with the substrate and, as the drive pins advance, the sections are extracted and driven into the soil. Various drive pins arrangements are shown and the drive pins may reciprocate along with a rotational or impacting stroke to penetrate the soil while implanting the substrate sections.

9 Claims, 27 Drawing Sheets

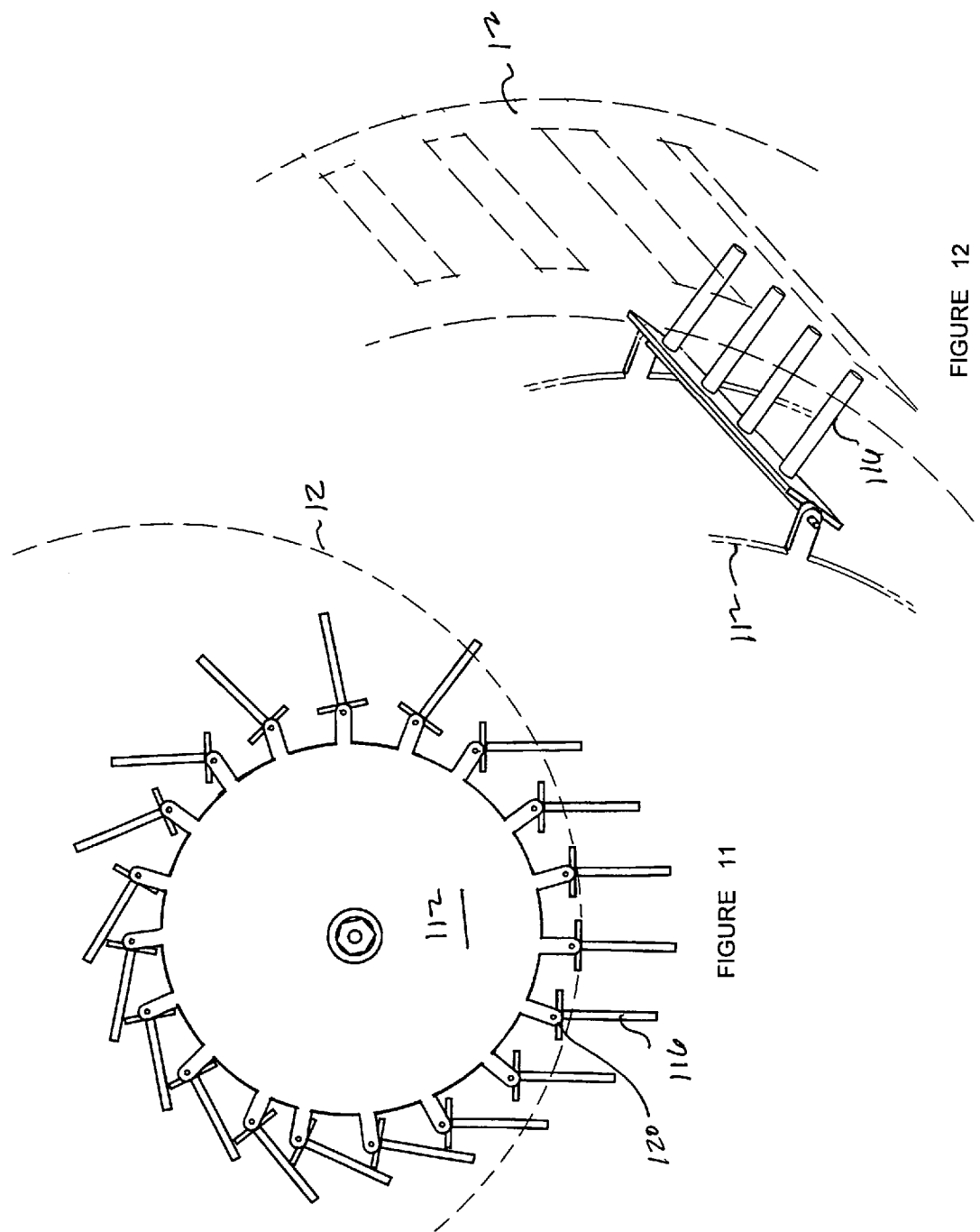

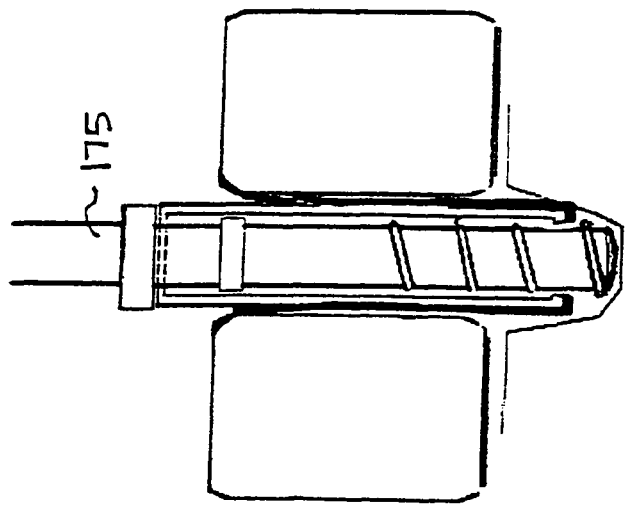
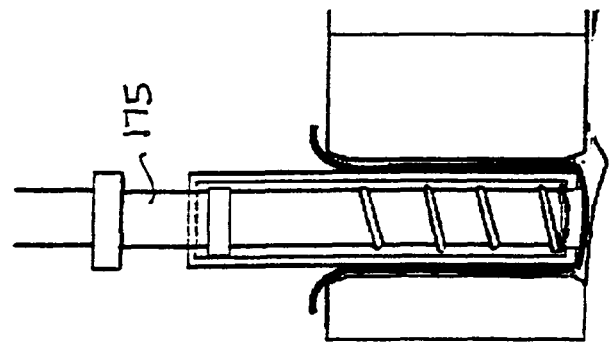
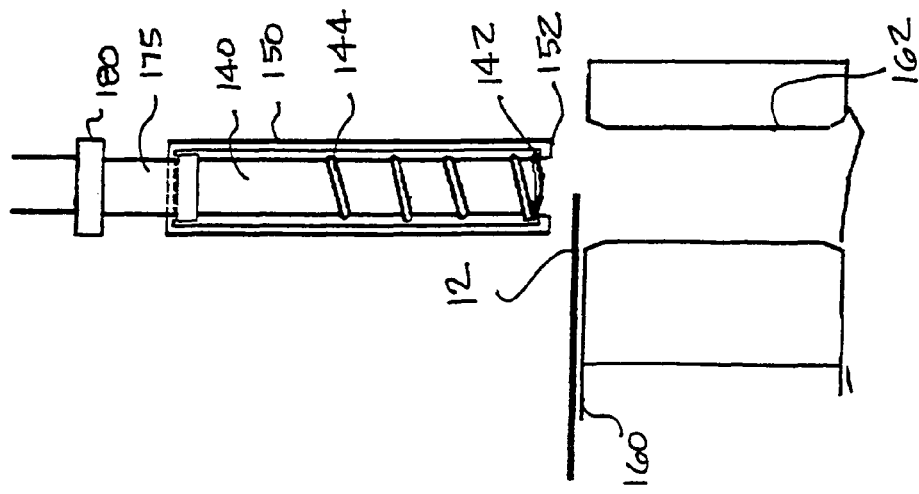

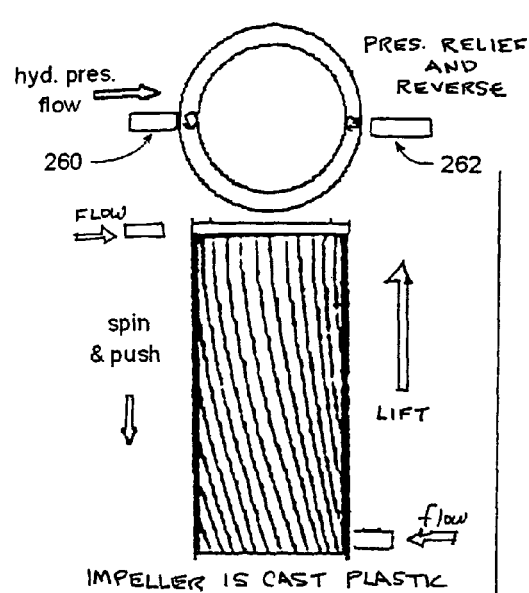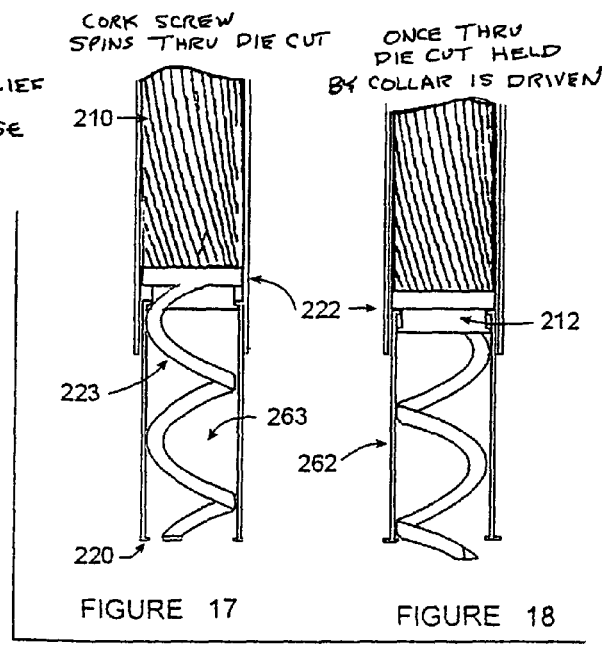
FIGURE 17   FIGURE 18
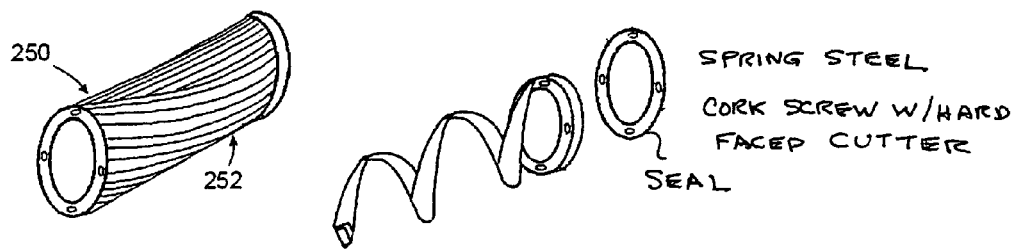
FIGURE 16

Typical Plug Installation Pattern

ARTIFICIAL GROUND COVER AND SYSTEM OF INSTALLATION

CROSS REFERENCE TO RELATED APPLICATION

This application is based on U.S. Provisional Patent Application Ser. No. 60/664,618, filed Mar. 22, 2005, of the same title.

FIELD OF THE INVENTION

The present invention relates to artificial ground cover in which individual blades are removably defined in flexible plies or sheets which are assembled into a multiple sheet substrate assembly for installation. The ground cover is installed by extracting the individual blades from the substrate assembly and driving or drilling the blades into the ground to provide a durable, naturally appearing ground cover. The artificial ground cover of the present invention has a wide range of applications and may be used for aesthetic and landscaping purposes, for weed control, fire control, as a ground cover for soil containing toxic or hazardous materials and as a covering to retain moisture in the soil.

BACKGROUND OF THE INVENTION

Various types of artificial turf grasses are known in the prior art. Most prior art artificial turf consists of a backing as for example, a fabric of synthetic yarn, to which a large number of artificial grass blades are affixed. The grass blades can be tufted, knitted or woven to the backing therewith to extend or protrude from the backing. Conventionally, artificial grass blades are manufactured from various types of plastic such as polyethylene and polypropylene and form a relatively wear-resistant ground cover, primarily to provide a surface for sporting activities. Typically, artificial turf is used on athletic fields, practice putting greens, playgrounds and other outdoor areas such as patios where a durable, carpet-like surface is desired.

Conventional artificial turf, as described above, is therefore limited in its application. Because of the manner in which the turf is constructed, conventional artificial turf is not generally usable as a ground cover and is not suitable for such applications as weed control, fire control and moisture control. Reference is made to U.S. Pat. Nos. 6,753,049 and 4,946,719 for discussion of prior art artificial turf materials and systems.

Therefore, from the foregoing it is apparent there exists a need for an artificial turf that may be used for such applications as landscaping, weed control, fire control and moisture control.

BRIEF SUMMARY OF THE INVENTION

Briefly, the present invention provides an artificial turf or ground cover provided in the form of a flexible substrate assembly having a plurality of plies or sheets. A plurality of individual blades are formed and defined in the individual sheets by die cutting, perforating or scoring. Each blade has a center section and opposite end sections. The opposite end sections of the blades have projections having the appearance of individual leaves or tips. The substrate assembly has multiple sheets or plies in juxtaposition with the blades relatively positioned so that during installation a number of blades from the various sheets may be driven into the soil or ground by drills or drive pins in a single operation.

The plies are formed from suitable synthetic material, preferably recycled plastics such as PET having weather and environmental resistance. The material is preferably colored to match the surrounding environment and may include a suitable UV inhibitor as well as including a fire or flame resistant substance. In some applications, the plies may contain or encapsulate materials to achieve characteristics for special applications such as a covering for hazardous soil areas. The material may be provided in a multi-layer substrate assembly on suitable rolls ready for installation.

The installation involves either continuing or intermittently transferring the material from a feed roll across a guide platen to a take-up roll. The installation apparatus is mobile and is mounted on wheels and may be manually advanced, self-propelled or may be coupled to a tractor or other motorized device. A plurality of drive pins or drills are aligned with apertures or tubes on a guide plate. The rows of pins or drills are aligned and extend transversely across the substrate assembly and, when actuated, will move downwardly engaging selected centers of individual blades causing them to be extracted from the sheet to which they are attached. As the blades are advanced, they are folded upwardly about their centers and driven through the tube or aperture into the subjacent soil. Typically, the center portion of each blade is driven into the soil a predetermined distance as for example four (4") inches. The opposite projecting leaf ends of the blades project upwardly from the soil, giving the appearance of an expanse of natural grass. The installation does not completely cover the soil surface leaving spaces for moisture absorption. The spacing, configuration and orientation of the individual blades on the substrate allow for substantial density of implanted blades for both aesthetic and environmental applications.

The drive pins may be fixed or rotate and extend from a planar pin pad or may be located on a rotating drum. When the pins retract, the take-up roll is actuated to advance the substrate to bring a fresh section of the feed roll into position for installation. The used or waste section of the substrate from which the blades have been extracted is taken up on a take-up roll and the material may be recycled. The drive pins may be actuated by any suitable mechanical means such as pneumatic or hydraulic cylinders, an electric hammer by a pneumatic or fuel hydraulic system. In one embodiment, the drive system will sense that an obstacle or hard soil has been encountered in the drilling operation and will retract the drive pins to prevent damage.

In another embodiment, the drive pins are imparted with both a reciprocal and an impacting motion during their stroke.

BRIEF DESCRIPTION OF THE DRAWINGS

The above and other objects and advantages of the present invention will become more apparent from the following description, claims and drawings in which:

FIGS. 11 and 12 illustrate details of the drill portion of a drive machine of FIG. 10;

FIGS. 13 to 15 illustrate yet another embodiment of the drill section of the drive or installation device showing the sequence of operation;

FIGS. 16, 16A and 17 to 19 illustrate yet another embodiment of an installation machine;

FIGS. 27 and 27A show the implant pin drive which imparts a reciprocal, impacting stroke;

DETAILED DESCRIPTION OF THE DRAWINGS

Figure 1:
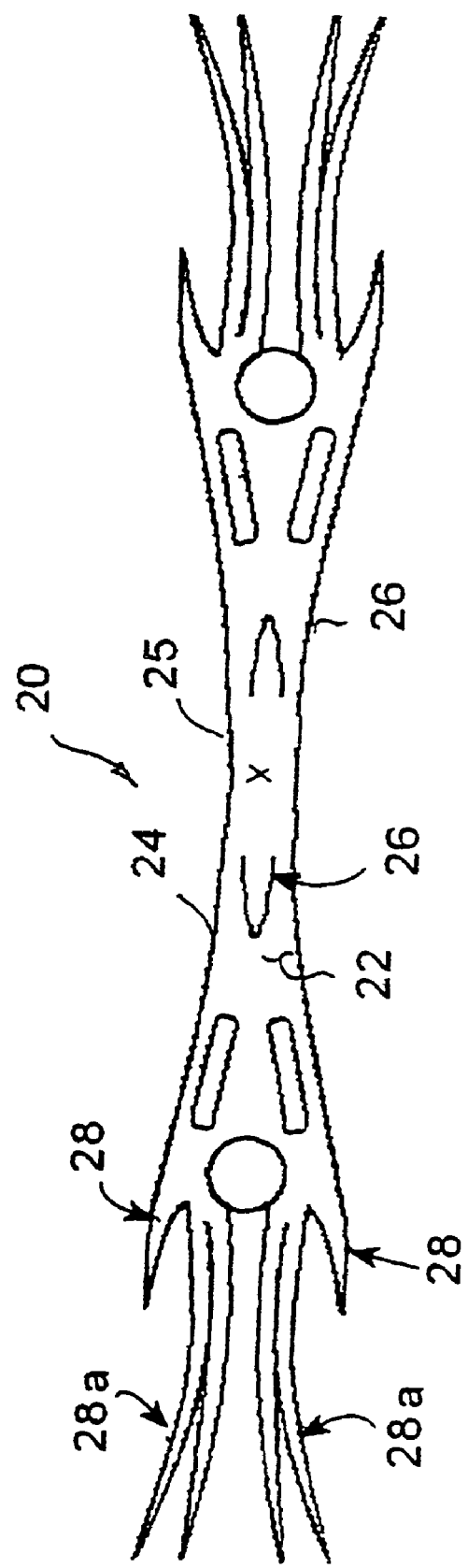
FIG. 1 is a plan view of an individual blade of artificial turf.
Figure 1A:
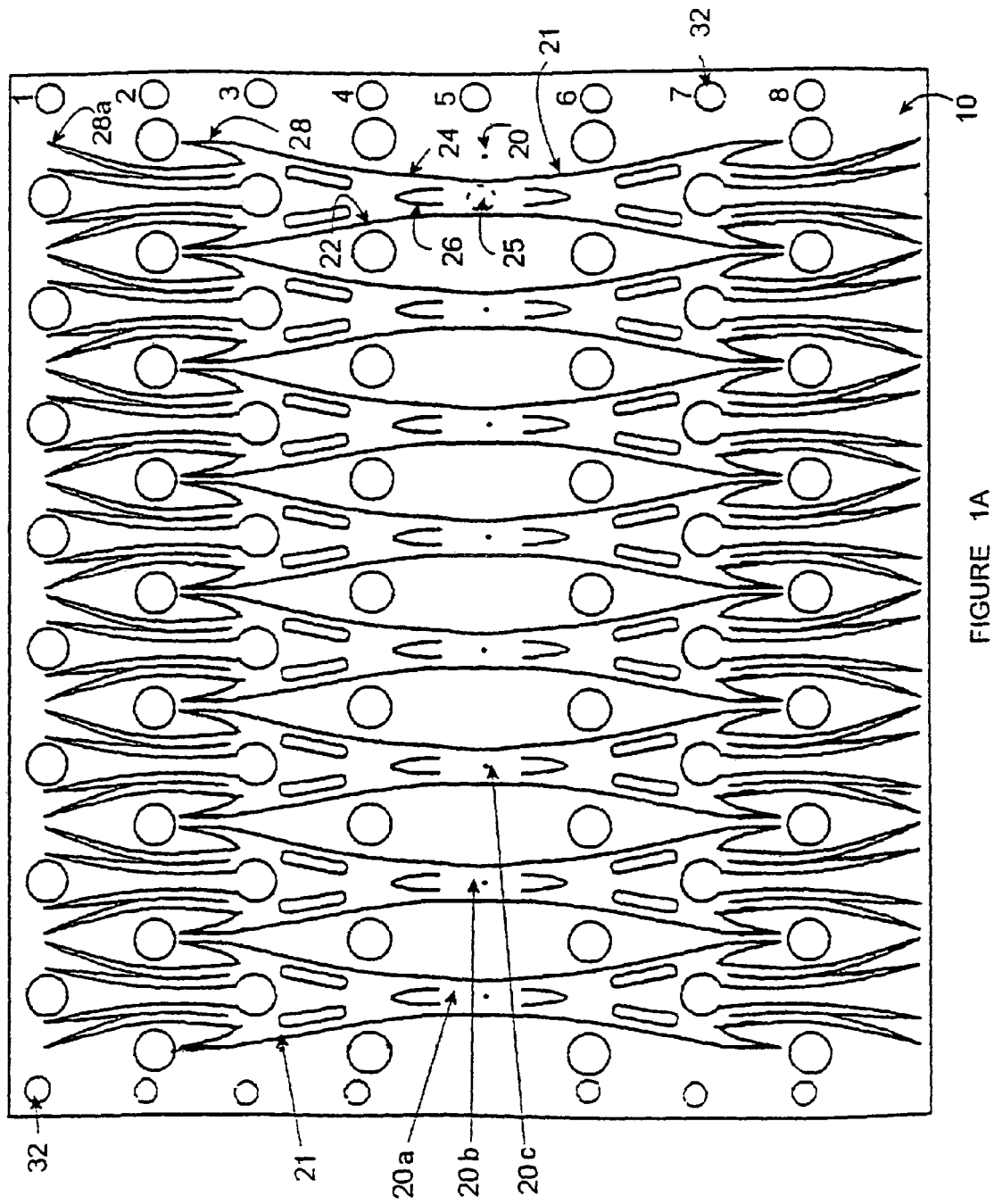
FIG. 1A shows a plan view of a section of turf material.
Figure 2:
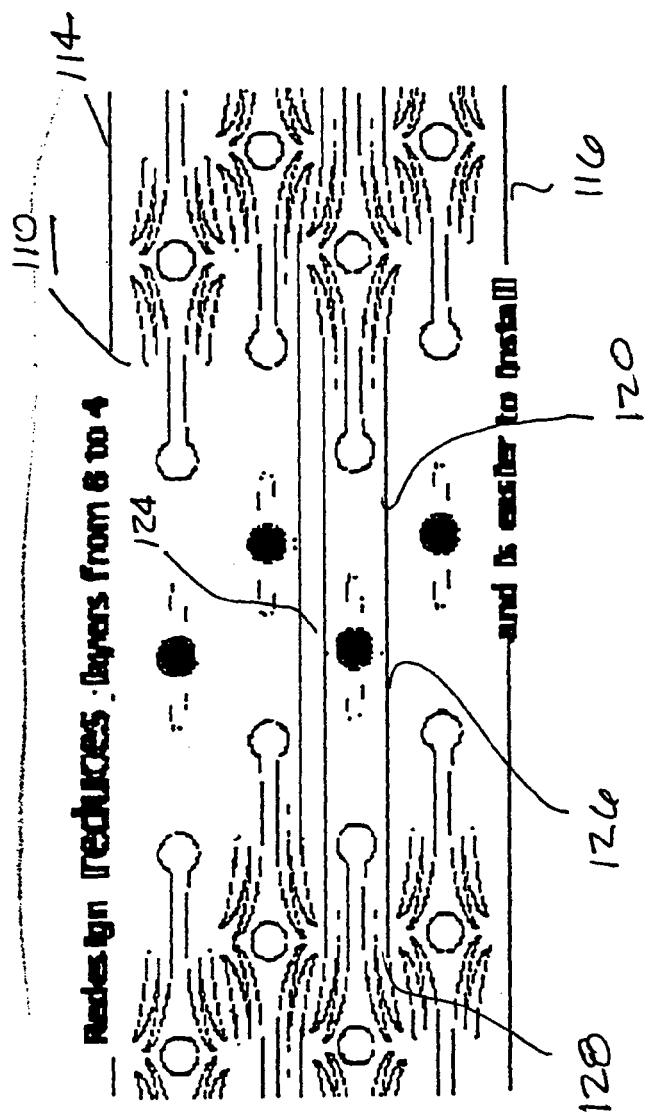
FIG. 2 is a plan view showing a slightly modified version of the blade of FIG. 1.
Figures 3, 4:
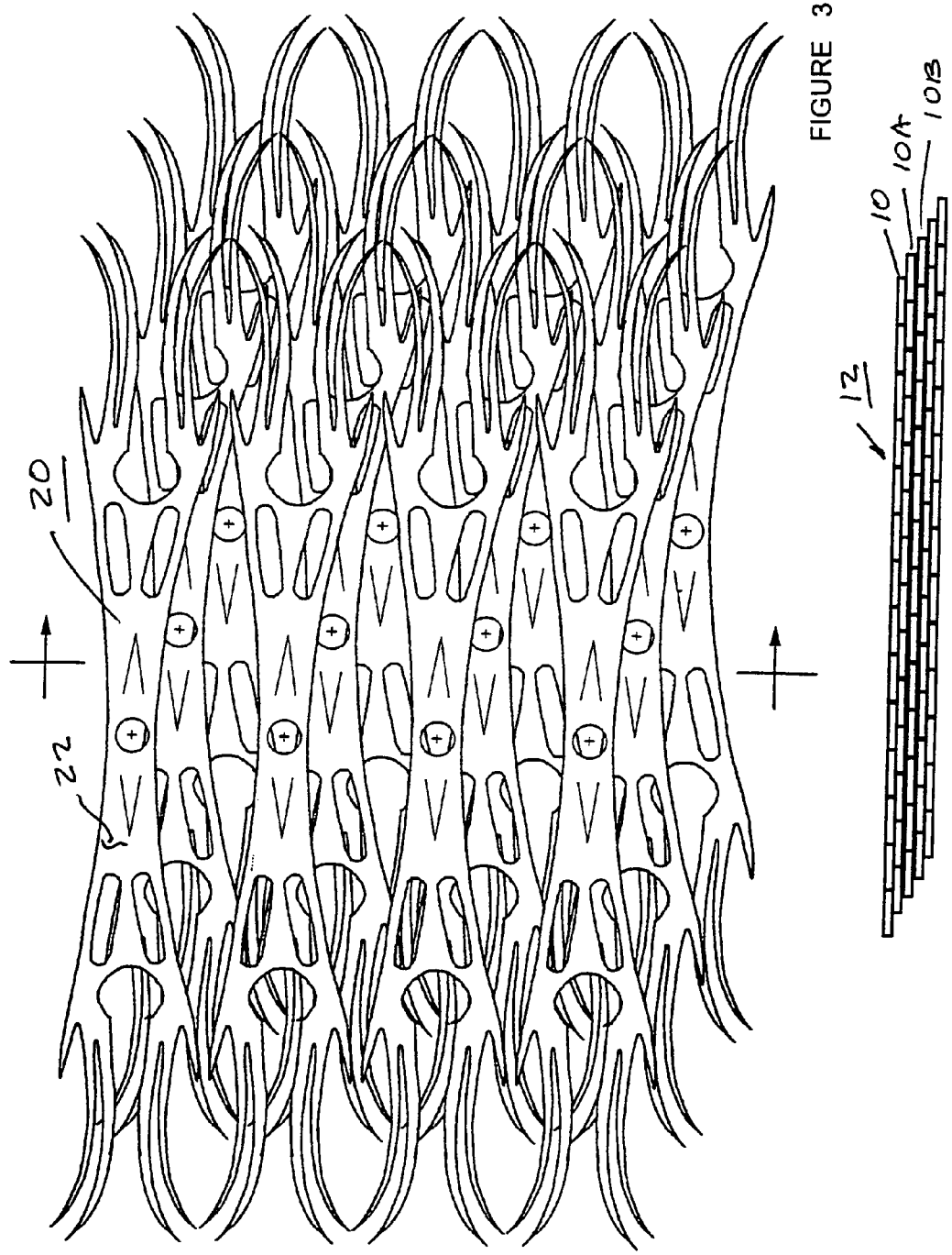
FIG. 3 shows the relative orientation of a multi-ply substrate with the waste material removed for purposes of illustration.
FIG. 4 is a sectional view of a multi-ply substrate which facilitates installation of a plurality of blades from adjacent plies in a single operation.

Referring to FIGS. 1 to 5, the artificial turf of the present invention is provided in individual sheets 10, 10A, 10B, etc., and the sheets assembled to form a multiple sheet or ply substrate assembly 12. As seen in FIG. 4, one embodiment of the assembly 12 consists of four layers or plies 10, 10A, 10B, etc., although other numbers of plies such as eight will work. Referring to FIG. 1A, a view of the top ply 10 of the assembly is shown. The material of the sheets is a flexible plastic material having suitable properties such as flame-resistance, durability, UV resistance and may incorporate or encapsulate substances to retain moisture and resist flame. The artificial turf which results is relatively long lasting, wear-resistant and provides an environmentally resistant surface. Suitable materials are PET, polyethylene and several particularly well suited materials are the materials sold under the trademarks Armorlon® and Gryfalon® available from Reef Industries, Houston.

Figure 5:
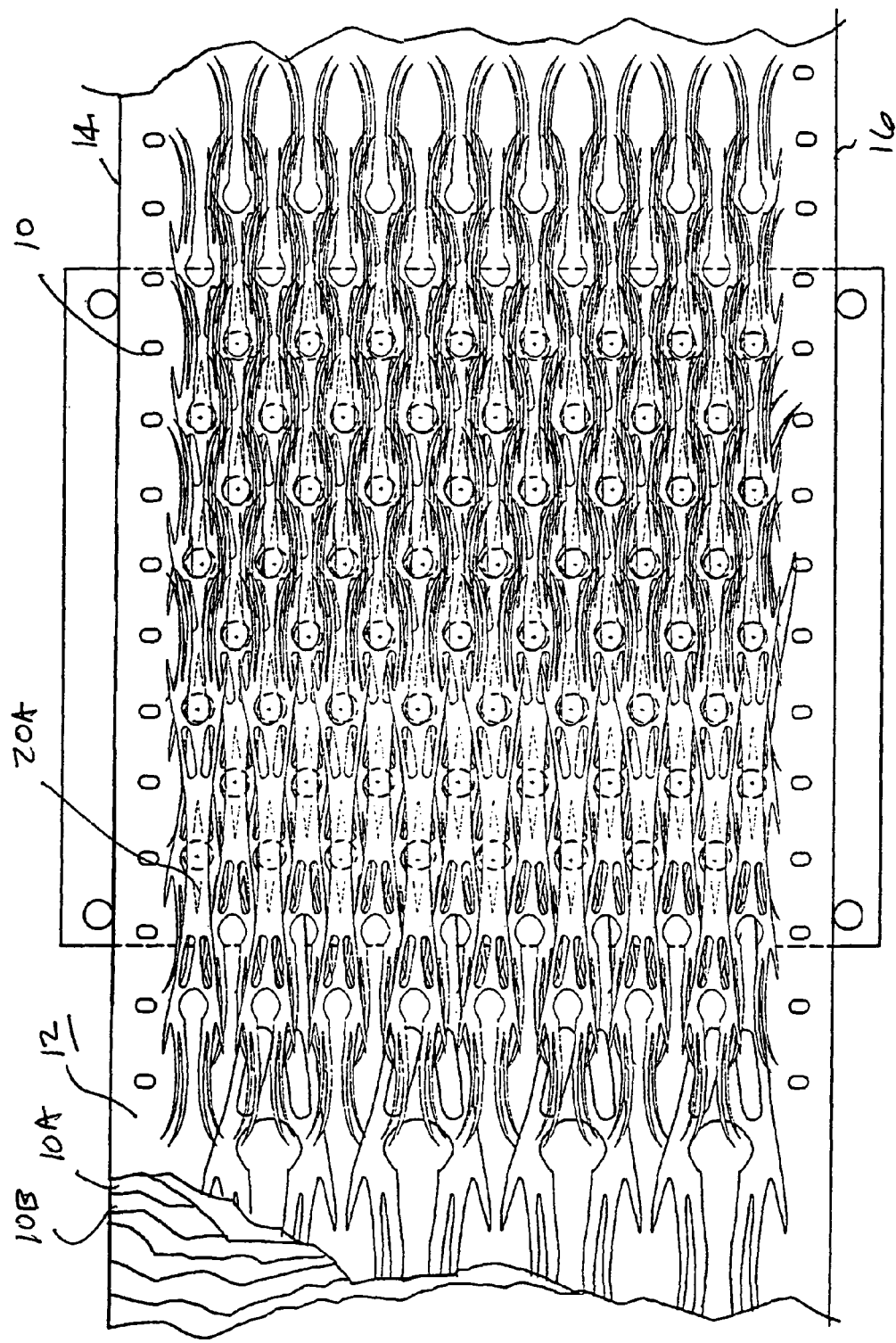
FIG. 5 shows the flexible substrate assembly aligned on a guide plate for installation.

The top ply 10 of the assembly 12, is shown in FIGS. 1A and 5 as being an elongate web having opposite sides 14, 16. Each ply typically has a thickness of about 8 to 12 mils. A plurality of individual blades 20, 20A, 20B, etc., are defined in the ply in side-by-side arrangement forming transverse rows and longitudinal columns. The individual blades 20 are preferably die cut, perforated or scored along their perimeter at 21 to facilitate extraction.

Figure 21:
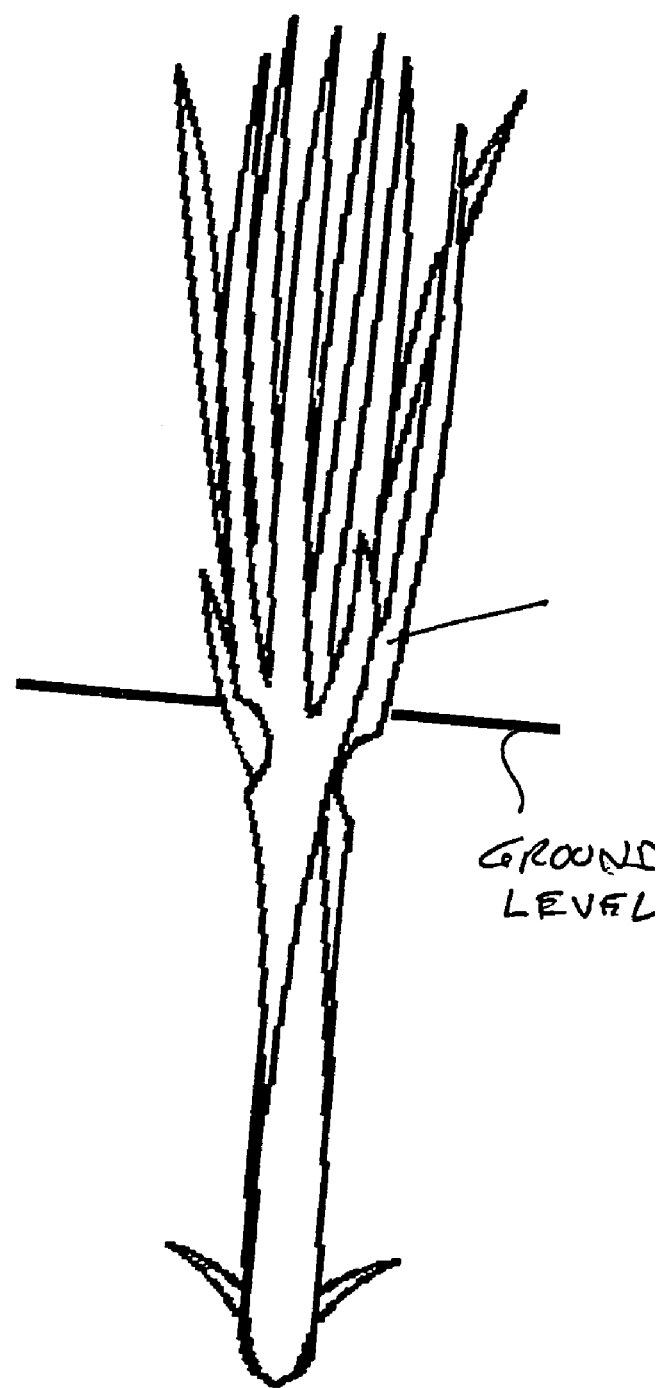
FIG. 21 shows an individual blade installed.

The individual blades 20 are similar in configuration each having a body 22, longitudinally extending opposite sides 24, 26, which may be slightly arcuate as seen in FIG. 1 or may be straight at 124, 126 as seen in FIG. 2. The straight sides result in a compact arrangement with less waste material remaining after installation and allows for an assembly having less layers. A central aperture 25 may be provided on the body. Relieved areas 26 may also be provided along the body of the individual blades to facilitate the installation process. The opposite ends of the blades are provided with a series of smaller extending leaves 28 and 28A which, when the blade is folded at its midpoint and installed, give the appearance of natural grass turf. FIG. 21 illustrates a single blade in its installed condition.

The next adjacent individual blade 20A is also die cut and perforated along its periphery and is closely adjacent the first blade. Subsequent blades 20B, 20C, etc., are arranged or disposed in horizontal row across the ply 10. An intermediate section of material 30 is defined between adjacent die cut blades defined by the adjacent side edges of the blades. The intermediate section remains after extraction of the blades and is "waste" material which is recovered and may be recycled.

The next adjacent row of blades is similarly configured and is longitudinally offset as best seen in FIG. 5. It will thus be seen that if four or eight plies or layers are arranged in overlying relationship, the center of the blades define a plurality of horizontally arranged rows as well as a plurality of parallel, angularly disposed rows. This arrangement can be fabricated using a single die to form the layers or plies. The upper ply is as shown in FIG. 1A. The next subjacent ply is similarly configured but is reversed or 'flipped.' Thus, every other row and every other ply will have the same orientation.

A modified arrangement for the web carrying individual die cut blades of grass is shown in FIG. 2. In this arrangement, the top ply or sheet 110 is again shown having opposite, longitudinal edges 114, 116. Again, the material is a suitable robust, wear-resistant, flexible material such as PET. A plurality of individual blades 120 are arranged as shown with blades 120A and 120B being aligned in a row and adjacent blades being longitudinally offset. Each blade again has opposite sides 124, 126 which are shown as being generally longitudinal and parallel and terminate at opposite ends of a plurality of projections or leaves 128. The tufts 128 terminate adjacent an aperture displaced inwardly from the ends. A central aperture is provided in the body of each blade and die cut tabs may be provided on either side of the central aperture to facilitate installation.

In some cases, the central aperture in each blade 125 may be eliminated or may be V-shaped relieved areas as seen in FIG. 1 as the drive pin used during installation can be arranged and positioned to contact a central portion of the body of each blade. In the embodiment of FIG. 2, the number of individual plies or layers has been reduced, for example, to four. With this arrangement, it is a more efficient use of material with less waste material remaining after the individual blades have been installed by punching them from the carrier sheets.

As mentioned above, the method of installation and the apparatus using the installation will be described in greater detail hereafter.

Figure 20:
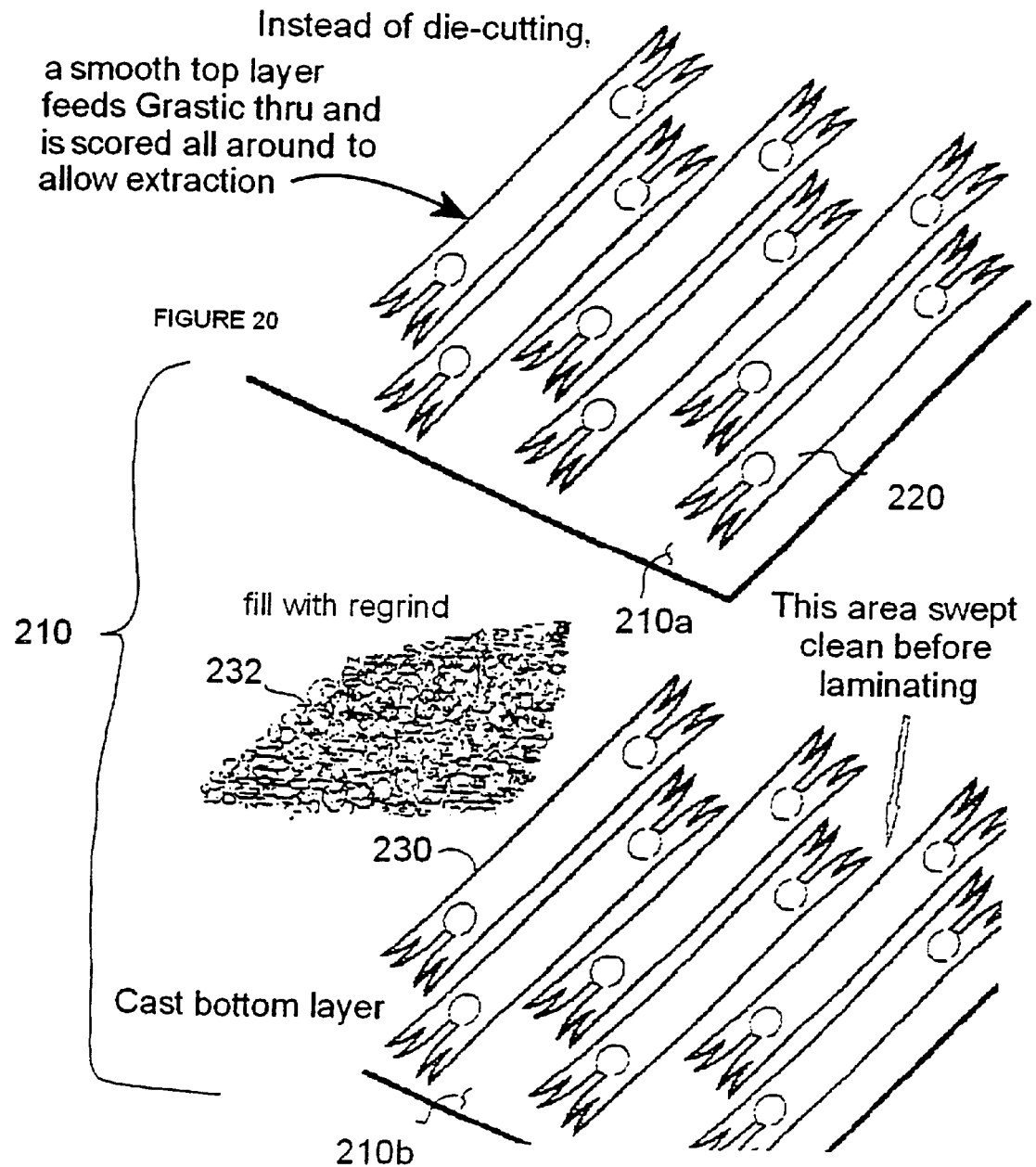
FIG. 20 illustrates an alternate embodiment of a sheet of artificial turf in which two plies are laminated to form a single ply.

FIG. 20 shows yet another embodiment of the individual sheets which carry the separable blades 220. The sheets are a laminate having an upper flexible sheet 210A and a bottom sheet 210B. The bottom layer is cast or molded having depressions 230 conforming to the shape and arrangement of the die cut or scored blade pattern 220 in the top sheet. The molded depressions are filled with particulate material 232 such as reground plastic and the two sheets 210A, 210B are laminated to form sheet 210 which is then arranged with other such laminates to form an assembly.

The individual blades of grass are separated from the carrier sheet and implanted or driven in to the ground using a plurality of reciprocal drive pins or drills. The number and arrangement of drive pins may vary depending upon the number and arrangement of individual blades of grass on the carrier sheet. A web, as shown in FIG. 1A, which has adjacent rows of eight individual blades of grass in offset relationship and which assembly contains eight plies or layers, requires a drive arrangement having a column of eight parallel rows of drive pins with each row containing eight pins is suitable. The pins are spaced to align with the centers on the apertures in the blades in the top sheet.

Figure 6:
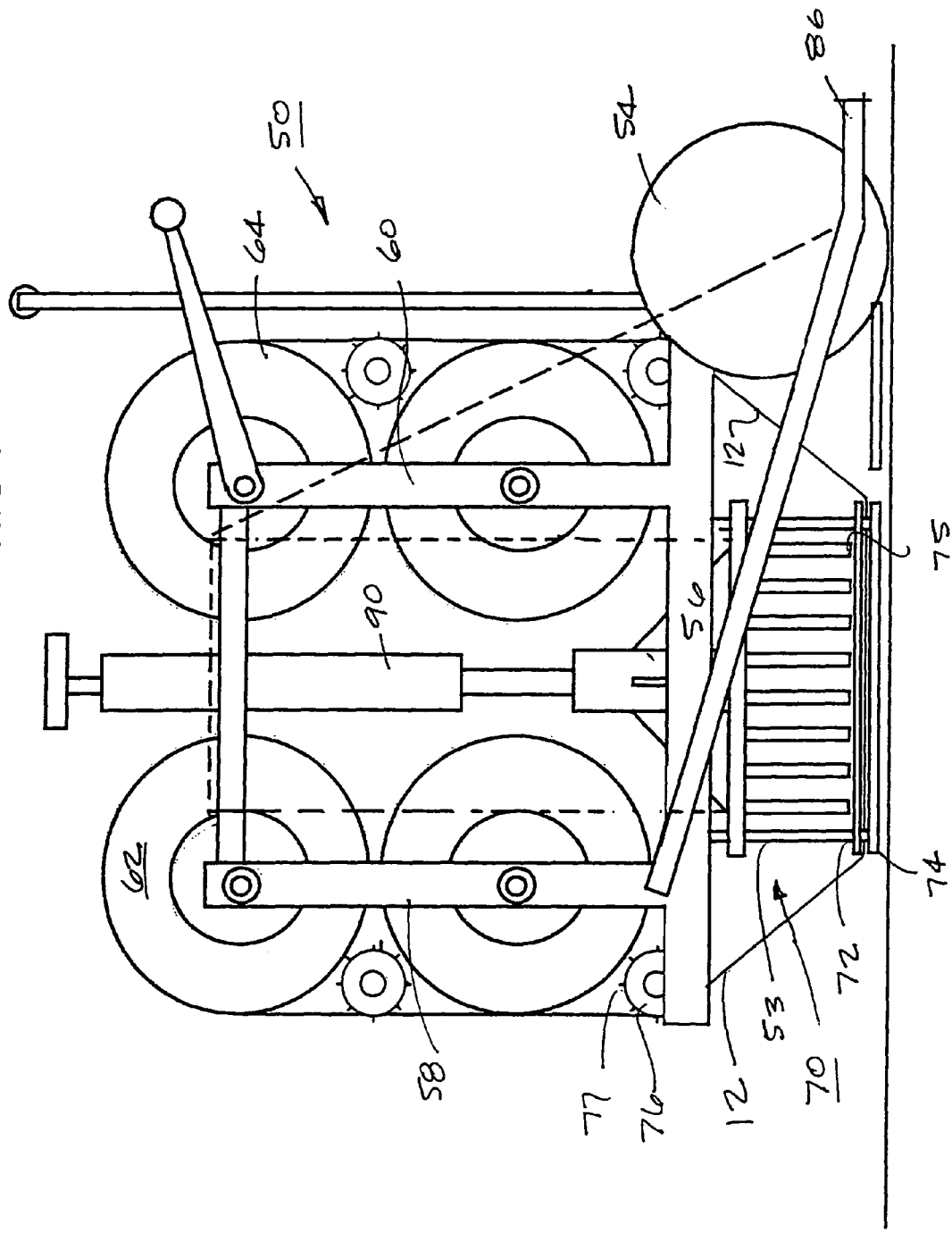
FIG. 6 is a side view of one embodiment of an installation machine.
Figure 7:
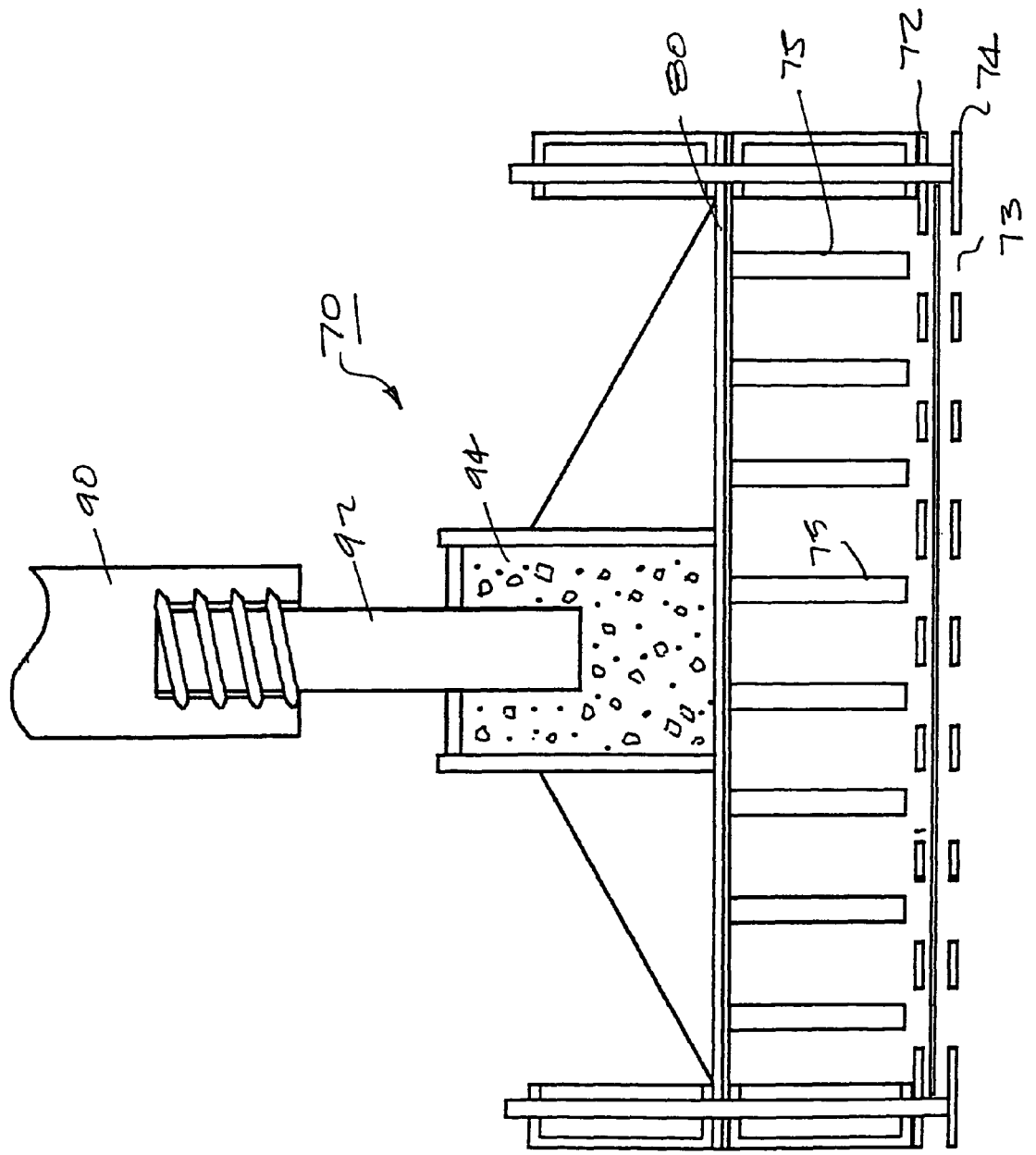
FIG. 7 is a detail view of the drive, guide plates and drill of the machine of FIG. 6.

One form of an installation machine 50 is shown in FIGS. 6 and 7 and include a frame 52 which is supported on one or more wheels 54 for mobility. The installation machine may be manually advanced or the wheels 54 or may be motor driven by a small electric or gasoline engine operated through a suitable clutch arrangement. The frame has a horizontal platform 56 with a pair of spaced-apart, upstanding reel support arms 58, 60. The forward reel support arms support a pair of vertically spaced-apart feed reels 62, each containing a supply of the web material, as described, wound on the reel. The rear reel support arm carries one or more take-up reels 64 for take-up of the web waste remaining after the individual blades of artificial grass have been separated and installed. Multiple supply and take-up reels may be provided as shown so that when one supply reel is exhausted, the operator may then easily transfer to the other supply reel. Similarly, multiple take-up reels are provided so that when one take-up reel is substantially filled to capacity, the operator can then attach the used web to the other reel. The used material collected on the take-up reels may then be suitably recycled. The installation process leaves no debris at the installation site. The reels may be motor driven or may be manually operated by a hand crank.

The drive head 70 of the installation device is disposed at a central location below the horizontal frame slightly above the level of the ground into which the layers are to be installed. A guide plate 72 is supported on frame members 53 extending downwardly from the horizontal frame. A base plate 74 is disposed below the guide plate. The plates 72, 74 define a plurality of apertures 73 spaced to align with the drive pins 75. The substrate assembly 12, which defines the separable blades 10, passes over the upper surface of the base plate 74 and beneath the guide plate and is advanced by drive sprockets 76 having pins 77 which register with the registration apertures 32 in the substrate assembly. The installation operation is cyclic with a section of substrate material 12 advanced to a loaded position properly aligned in position with respect to the drive pins. Advancement or travel of the substrate assembly is interrupted and the section of the web aligned with the drive pins is ready for installation.

The drive pins 75 extend downwardly from a pin pad 80 as best seen in FIG. 7. The drive pins may be tapered or be stepped having greater diameter at their upper end. The drive pins are fabricated from a suitable high quality tool steel and are reciprocated by either an electrical or mechanical means. Electrical means may be provided by an electric cylinder 90, as shown, having a downwardly extending cylinder rod 92 which attaches to a weight 94 on the pin pad. A pneumatic air hammer may be used instead of the electric cylinder. The drive cylinder can be selectively operated by the operator. The installation machine may carry a small motor which may provide hydraulic or pneumatic energy or which may drive a small generator to provide electric energy to operate the cylinder. A tilt bar 85 is shown affixed to the frame to allow the operation to apply foot pressure at foot rest 86 to lift the front of the machine when it is advanced.

Figure 8:
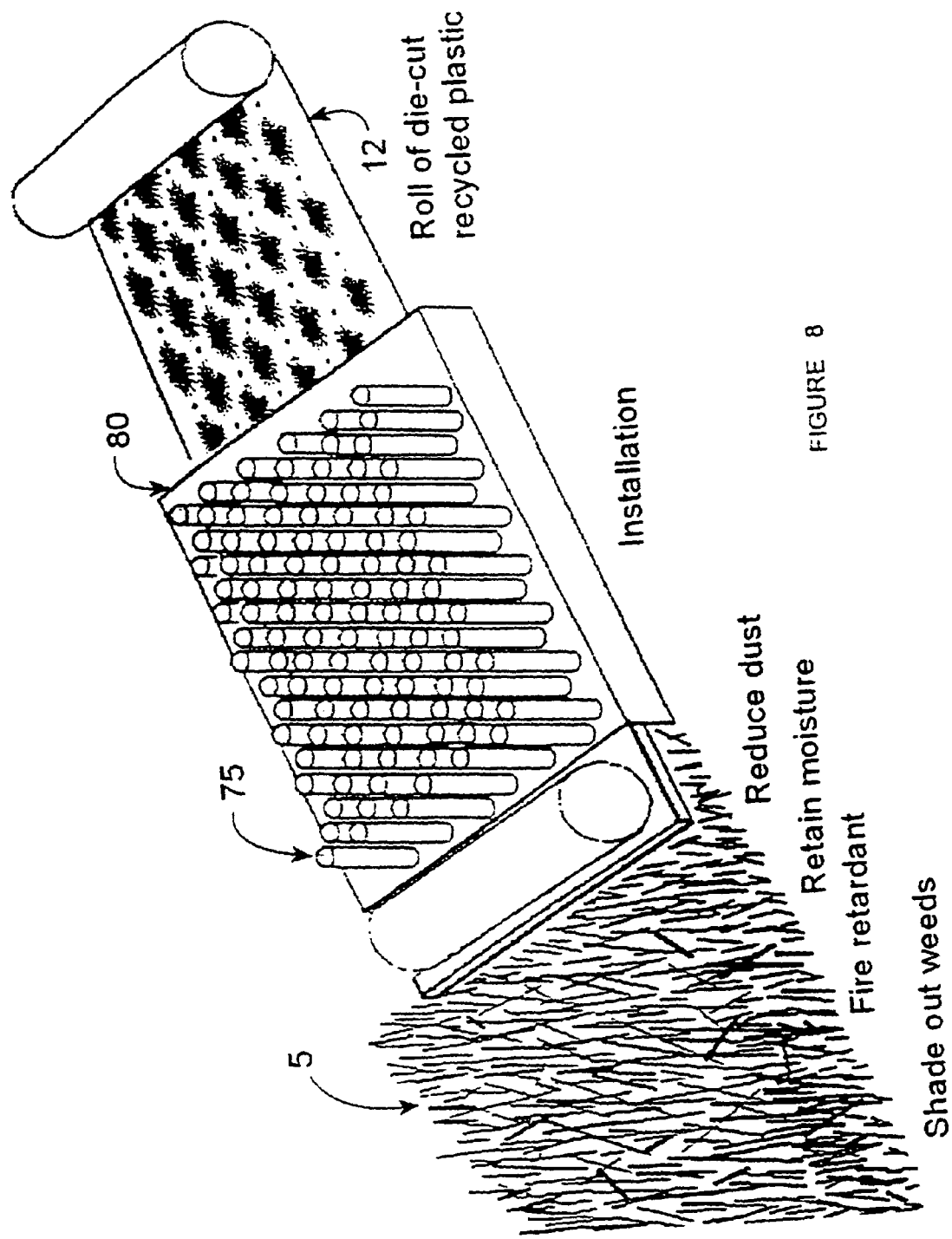
FIGS. 8 and 9 schematically illustrate the installation from above ground level and as viewed from beneath the installation machine.
Figure 9:
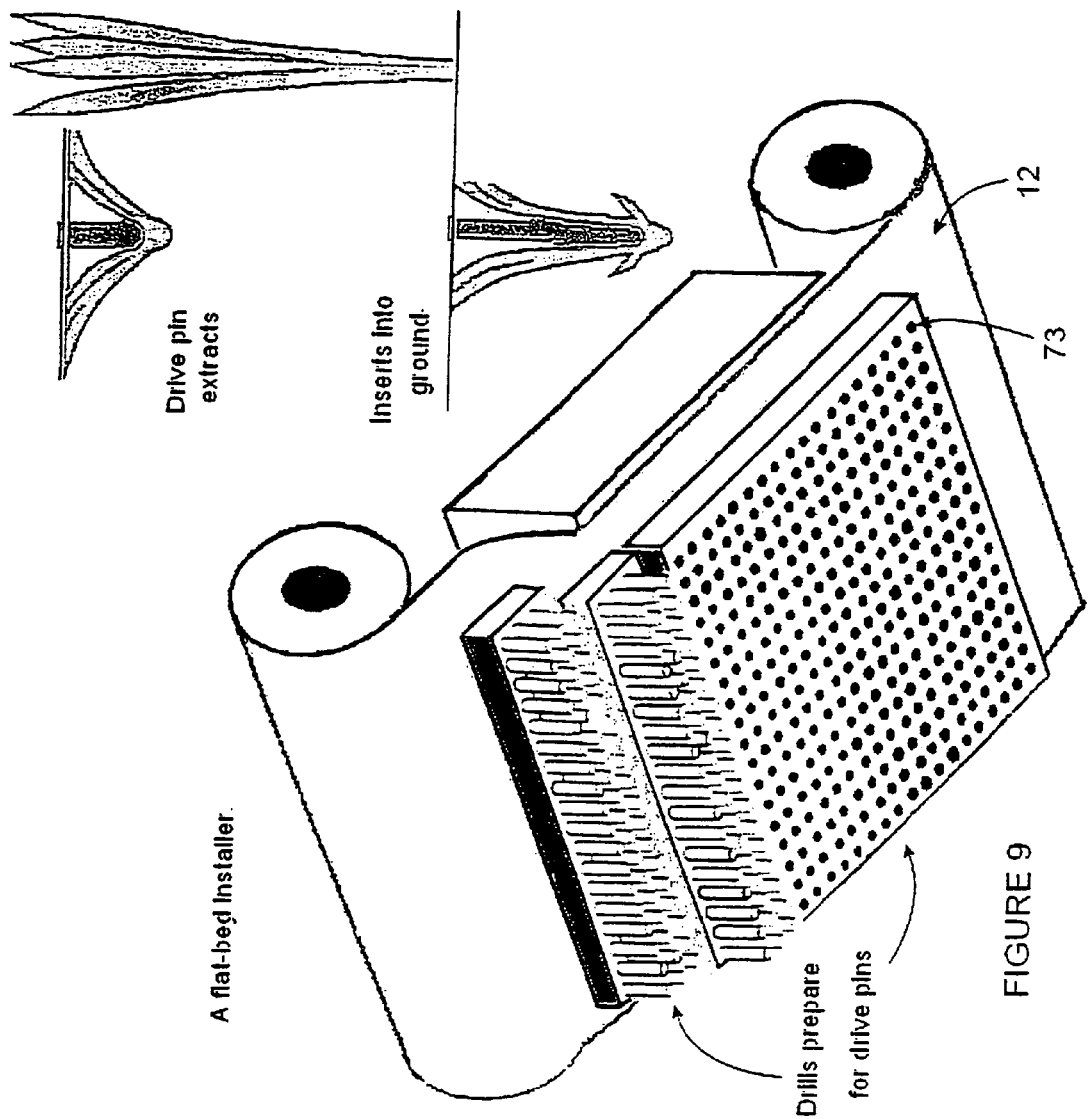
Figure 22:
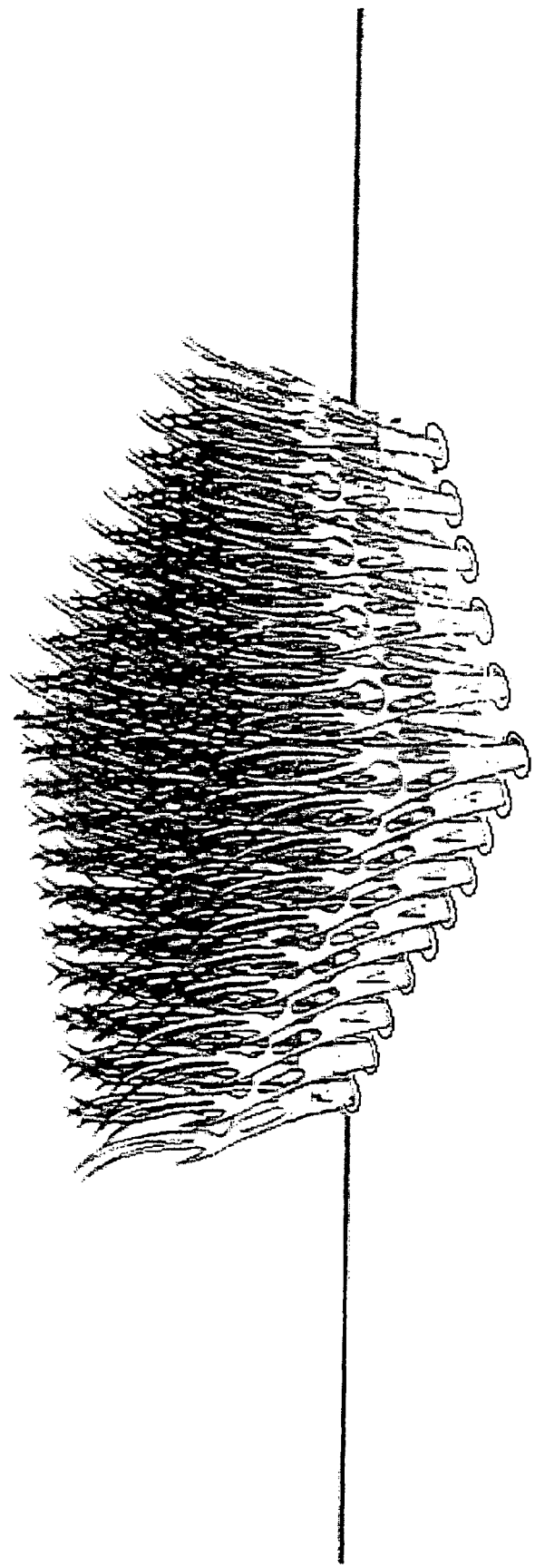
FIG. 22 shows a plurality of blades installed in a ground area.

The installation process is shown in FIGS. 8 and 9. A section of the substrate has been advanced to align with the drive pins 75. A previous section S of artificial grass is shown as having been installed, as shown, and the next adjacent section is ready for installation. The machine is suitably positioned and advanced to the location for the next installation. If the machine is manual, the operator can simply tilt the machine using the tilt bar and manually move it rearwardly to a suitable location. As mentioned above, the device may also be powered in which case the machine would be tilted and driven to the new installation location. Once in the proper location, the operator will actuate the drive pin cylinder 90 causing the elongate drive pins 75 to move downwardly each engaging individual blades selected from the multiple plies in the substrate assembly. The blades 20 will be forced through the apertures 73 in the base plate. The drive pins continue to move downwardly driving the blade well into the subjacent ground layer. Typically, the blade will be driven into the ground about 4" deep which will leave individual leaves of grass projecting above the ground surface having the natural appearance of grass. This is shown in FIGS. 21 and 22. Once the blade is installed, the drive pins and barrel will retract together for a selected distance, as for example 4". The installation process is complete and the machine is ready for reloading. This is accomplished by moving the machine to the next installation location and advancing the web so a new section of the web is brought into alignment on the barrel base. The used web material from which the individual blades have been separated is wound onto one of the take-up reels for recycling.

FIG. 4, shows a path of an individual drive pin as it passes through the multiple ply or layers of the web to engage a single blade.

Figure 10:
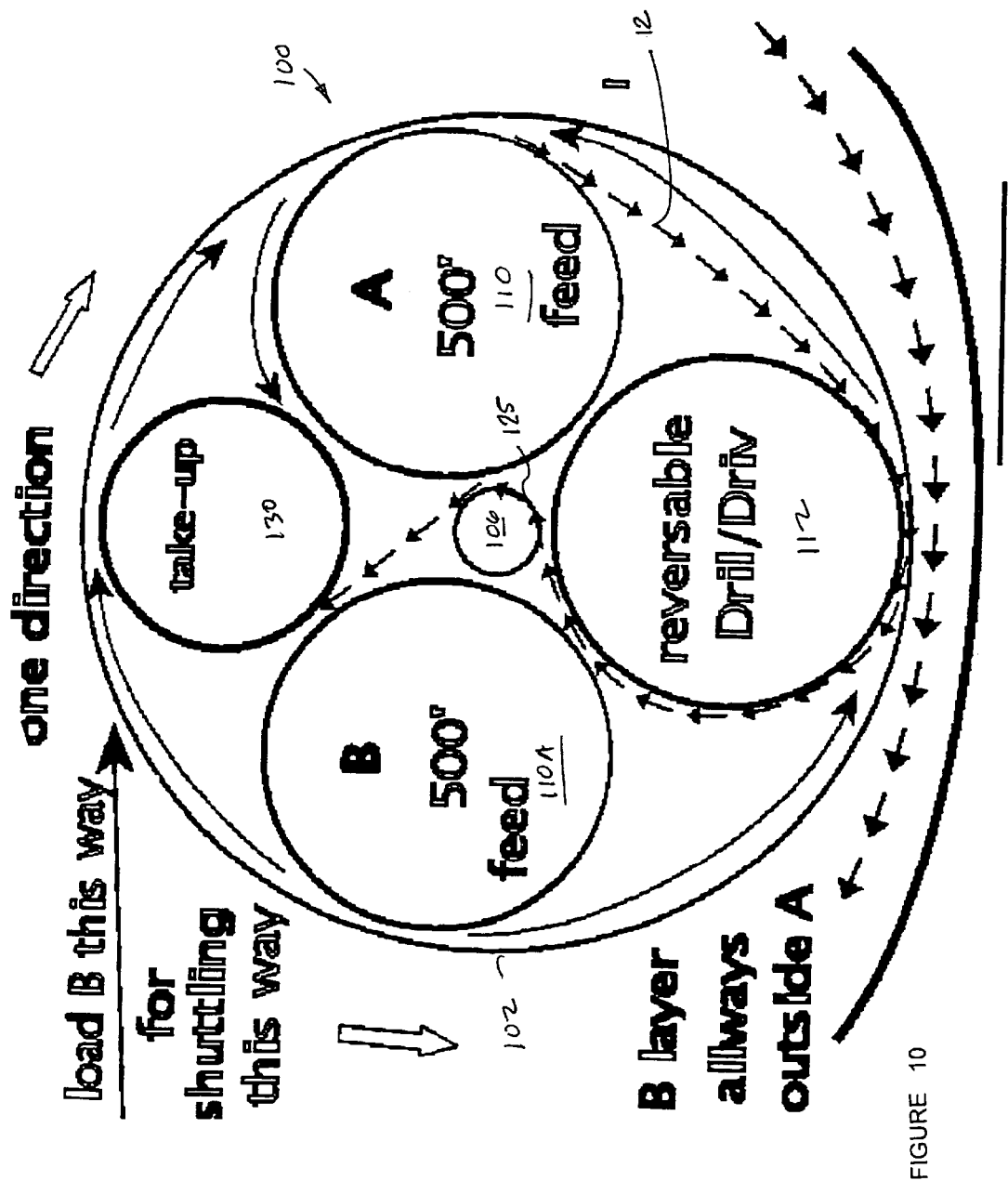
FIG. 10 illustrates another embodiment of an installation machine.

FIGS. 10 to 12 illustrate an alternate embodiment of the installation machine designated by the numeral 100. The machine has a circular housing 102 with a center axle 106 so the machine may be attached to a towing device or a cable and pulled or guided over hilly terrain. A pair of feed reels 110, 110A are mounted in the housing each having a supply of the substrate assembly 12.

A reversible drive drum 112 carries a plurality of rows of drive pins 116 which are pivotal on the drum at 120 and when they reach or approach the bottom dead center position, extend downwardly to separate the aligned blades for the carrier assembly, as seen in FIG. 11. The feed roll utilized will depend upon the direction of the installation. The roll 110 will be utilized in the direction indicated by the arrow. Similarly, roll 110A will be utilized in the opposite direction as indicated by the associated arrow.

A feed roller 125 is rotatively driven by the center axle sprocket bar pins which register with the registration perforations on the edge of the substrate to advance the substrate. The substrate waste material from which the blades have been removed is taken up on reel 131.

In some areas, the condition of the soil will make direct insertion of the individual tufts of grass difficult. In such situations, the modified form of the installation machine, as shown in FIGS. 13 to 15, may be utilized. In this installation, the drive pins 175 are a hard material such as a high carbon steel or even carbide. Each of the drive pins 175 is provided with an elongate body 140 having a collar 142 inward from its lower end. A section of the drive pin from the collar to the end is provided with flights 144 similar to an auger or a drill bit. The distal bit end of the drive pin is sharpened. The individual drive pins, in addition to being reciprocal, are also reversibly rotatively driven at gear or sprocket 180. The array of pins may be on a pad and are reversibly driven by interconnecting gears or chains connected to the gears or sprockets 180 as is commonly known. A slidable collar 150 having a flange 152 is disposed about each pin. The base plate 160 has downwardly depending barrels 162. The substrate is advanced over the upper surface of the base plate.

During the installation, the drive pins will advance and engage the end of the collar. The collar will engage a blade defined in the substrate 12. The collar and pin advance to the positions shown in FIG. 14 which extracts the blade. The individual blade is held by the collar and the drive pin is further advanced and is rotated to separate the blade and bore it into the soil. Once the drive pins have advanced to a suitable depth, as seen in FIG. 15, the direction of rotation is reversed and the drive pin and collar will retract leaving the blade in place. The drive pin and collar return to the positions shown in FIG. 13 ready to repeat the installation cycle.

The flexible substrate assembly may be provided with various enhancements such as the addition of fire retardants, plant seeds, herbicides and shielding material. The latter may be incorporated if the area to which the ground cover is applied contains toxic or radioactive materials. These may be in the form of a coating applied to the carrier assembly plies or may be encapsulated into the material at the time of fabrication. Scoring or die cutting is applied after the material is made.

The covering may be applied by an installation machine as described above or as described below. The individual layers may be scored by die cutting to define the individual grass blades for extraction and the edge of the multi-layer assembly perforated to align with the teeth of a feed mechanism. The individual plies are arranged in a multi-layer carrier assembly and bonded at selected locations by adhesives or heat bonding.

An alternate drive pin arrangement is shown in FIGS. 16, 16A, 17, 18 and 19. Simple reciprocating drive pins will work in most soils. However, soils containing hard clays, rocks or deposits such as caliche may require more aggressive installation procedures.

In FIGS. 16 to 19, a single drive pin of an array of drive pins is shown. The drive pin 275 may be incorporated into the pad installation machine as described above. The machine has a bottom plate having apertures aligning with the drive pins and the centers of the individual blades of a multi-layer substrate as has been discussed. A circular flange or barrel 262 depends from the plate defining a cylindrical passage 263.

The drive pins are each housed in a cylindrical housing 210 having an annular piston plate 212 reciprocal therein. The edge of the annular plate carriers a seal 222. A drive bit 225 having the configuration of a spiral or corkscrew has its upper end secured to the annular piston plate 212. The tip is extendable through the opening 220 at the lower end of the housing 210.

A hollow, cylindrical impeller 250 has an outer surface defining a circumferentially extending spiral groove 252. Fluid connections or ports 260, 262 are provided at opposed locations in the cylinder housing 210 at intermediate locations.

Fluid, such as air or hydraulic fluid, admitted under pressure into one of the connections will cause the impeller and attached screw to rotate in one direction or the other. The direction of rotation is determined by the direction of fluid flow. Fluid is exhausted from the opposite port.

Figure 16A:
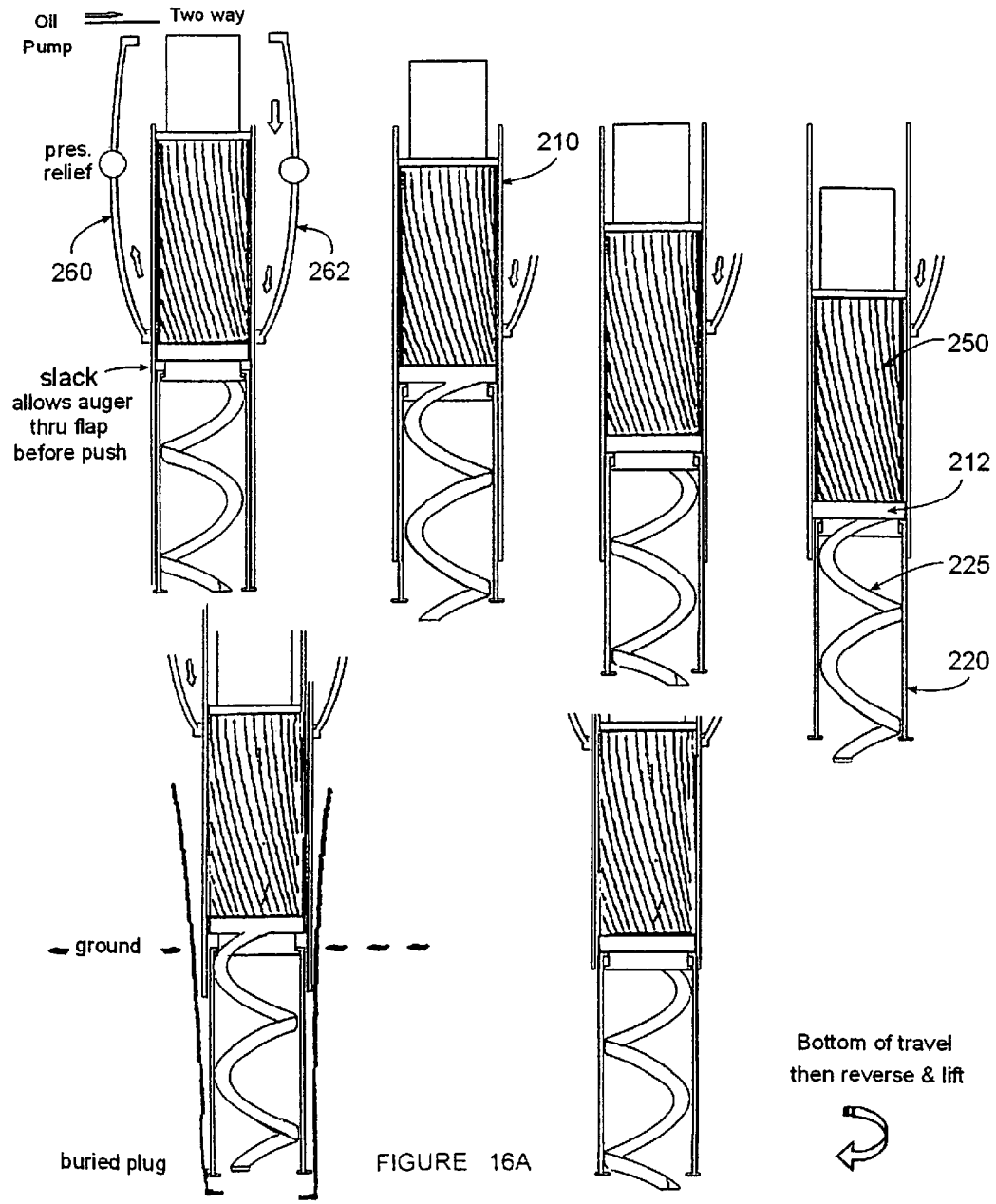
Figure 19:
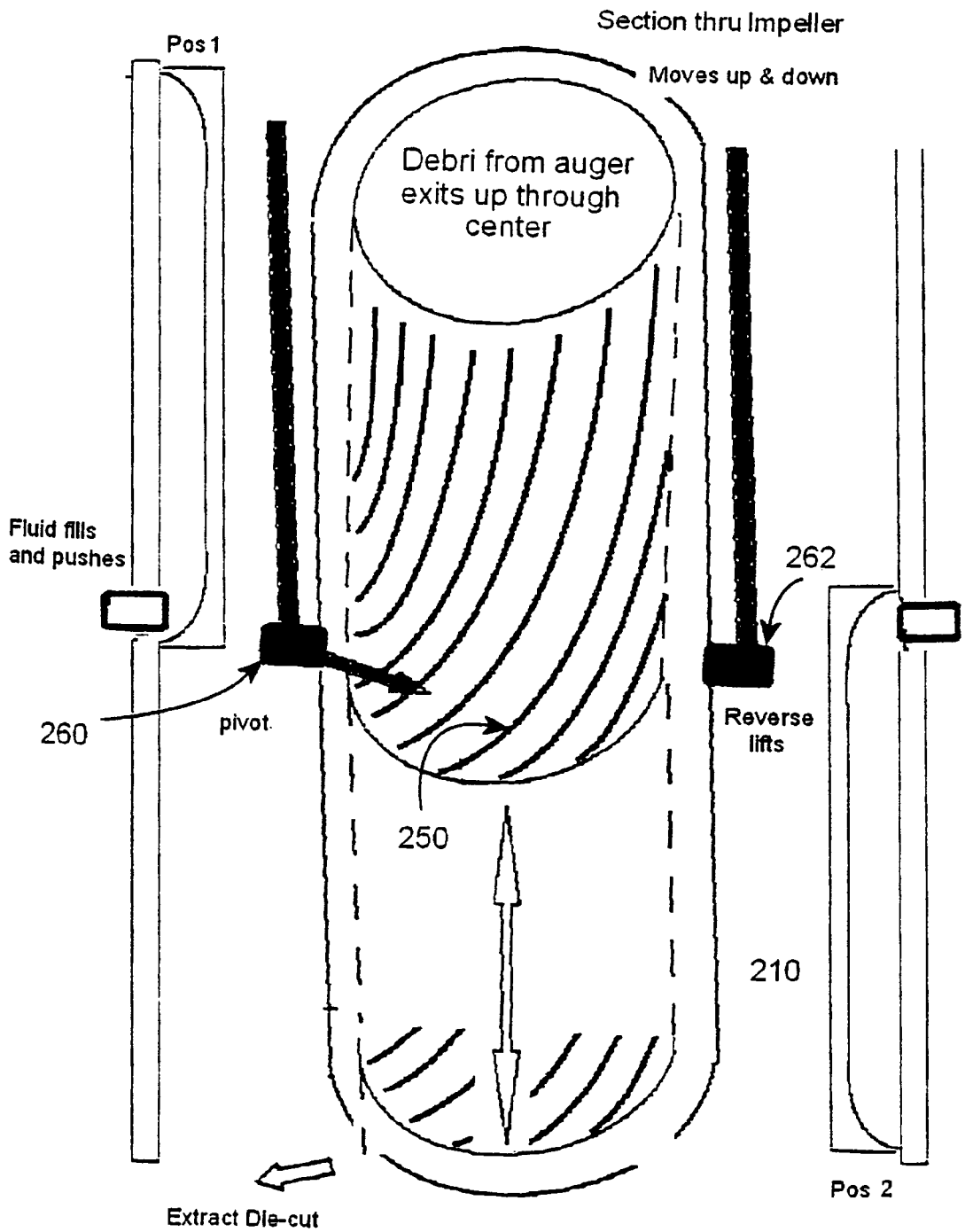

FIG. 16A illustrates the operational sequence which occurs when the drive pin is actuated to extend to separate and install a blade of artificial grass. The rotational direction is controlled by a single hydraulic shuttle valve V connected to a source of hydraulic fluid P.

The substrate is advanced to a position aligned and immediately below the end 220 of the housing. The impeller is rotated and the corkscrew bit is advanced engaging the center of the blade driving it into the subjacent soil.

If the screw encounters a rock or other obstacle, the fluid pressure in the fluid chamber will increase as the bit "stalls." At a predetermined pressure setting, a relief valve will open to direct fluid to a reservoir and will discontinue rotation and advancement of the screw. The relief valve will close and when the fluid flow is reversed, the "stalled" pin, as well as the others which have activated, will shuttle upward to a reload position.

Turning now to FIGS. 23 to 31, another embodiment of the planting apparatus is shown and is designated by the numeral 300.

Figure 23:
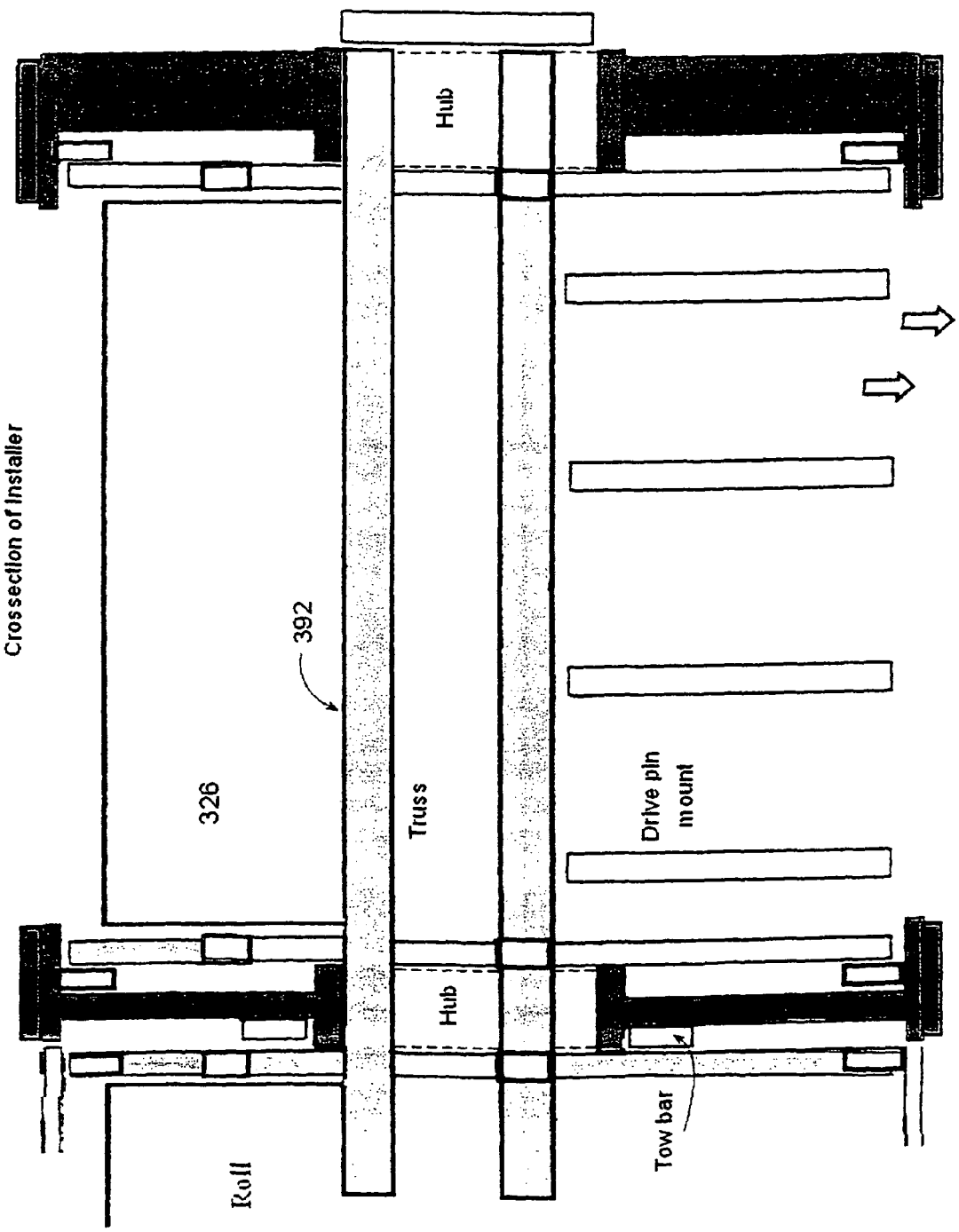
FIG. 23 is a schematic view of another embodiment of the installation apparatus of the present invention in which sections of a substrate are implanted into soil by a reciprocating, impacting device.
Figure 24:
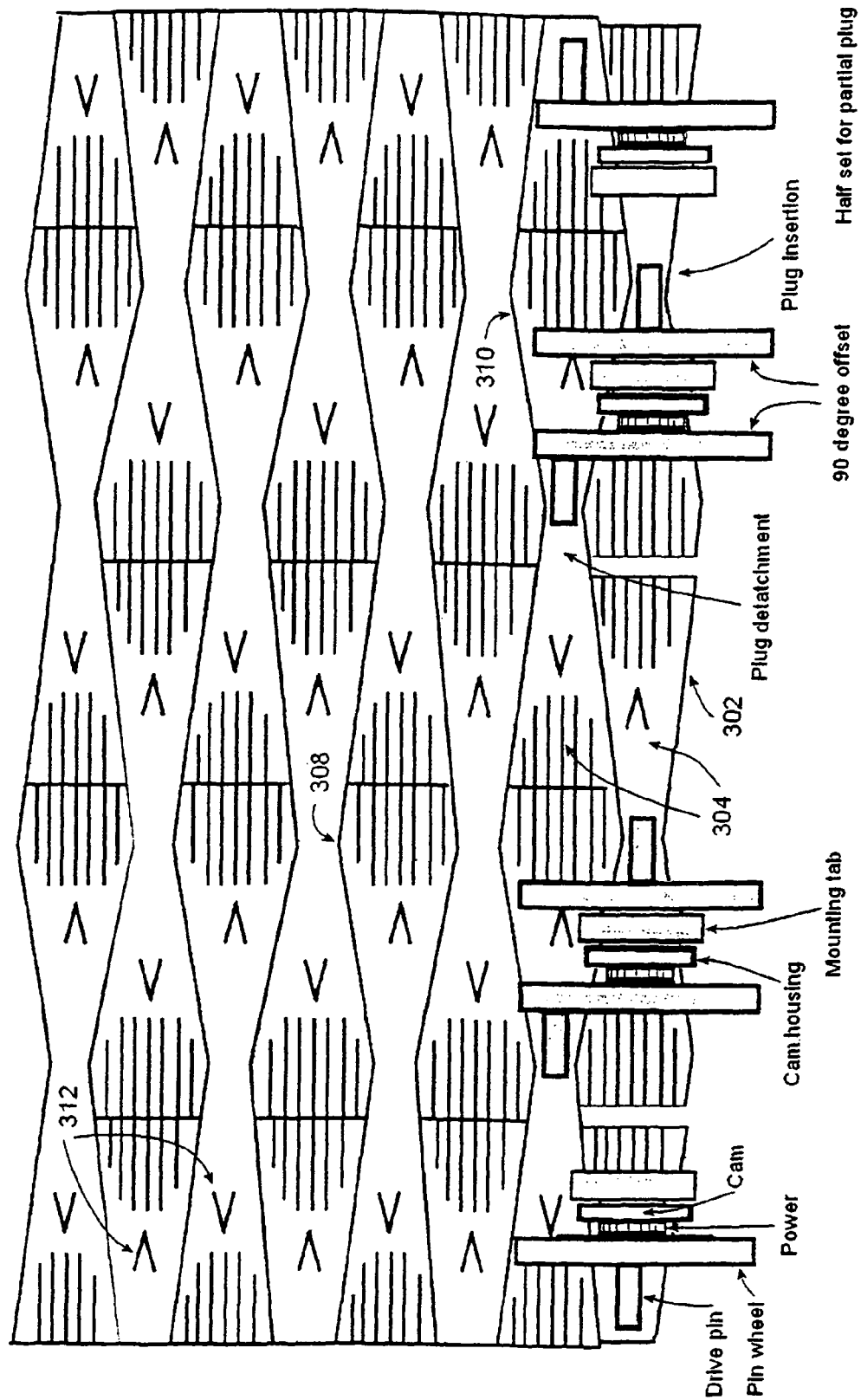
FIG. 24 shows the substrate of FIG. 23 and the drive wheel assemblies which extract the substrate sections.

As shown in FIG. 23, the substrate 302 may be a single layer or ply of a flexible material as described. The material is a flexible material such as plastic, as described above, and may be impregnated with substances to provide UV resistance, color and other characteristics. As shown, the individual sections 304 which are shown in the shape of blades are defined by die cutting or perforations 306. The sections extend transversely across the substrate 302. Preferably the individual sections 304 are compactly arranged so that the edge of one section also defines the edge of the adjacent section. The rows of sections are off-set, as shown, and each has a central section 308 with side edges 310 which converge towards opposite ends from the mid-section. The substrate is provided with perforations 312 which are engaged by a substrate carrier, as will be explained.

Figure 25:
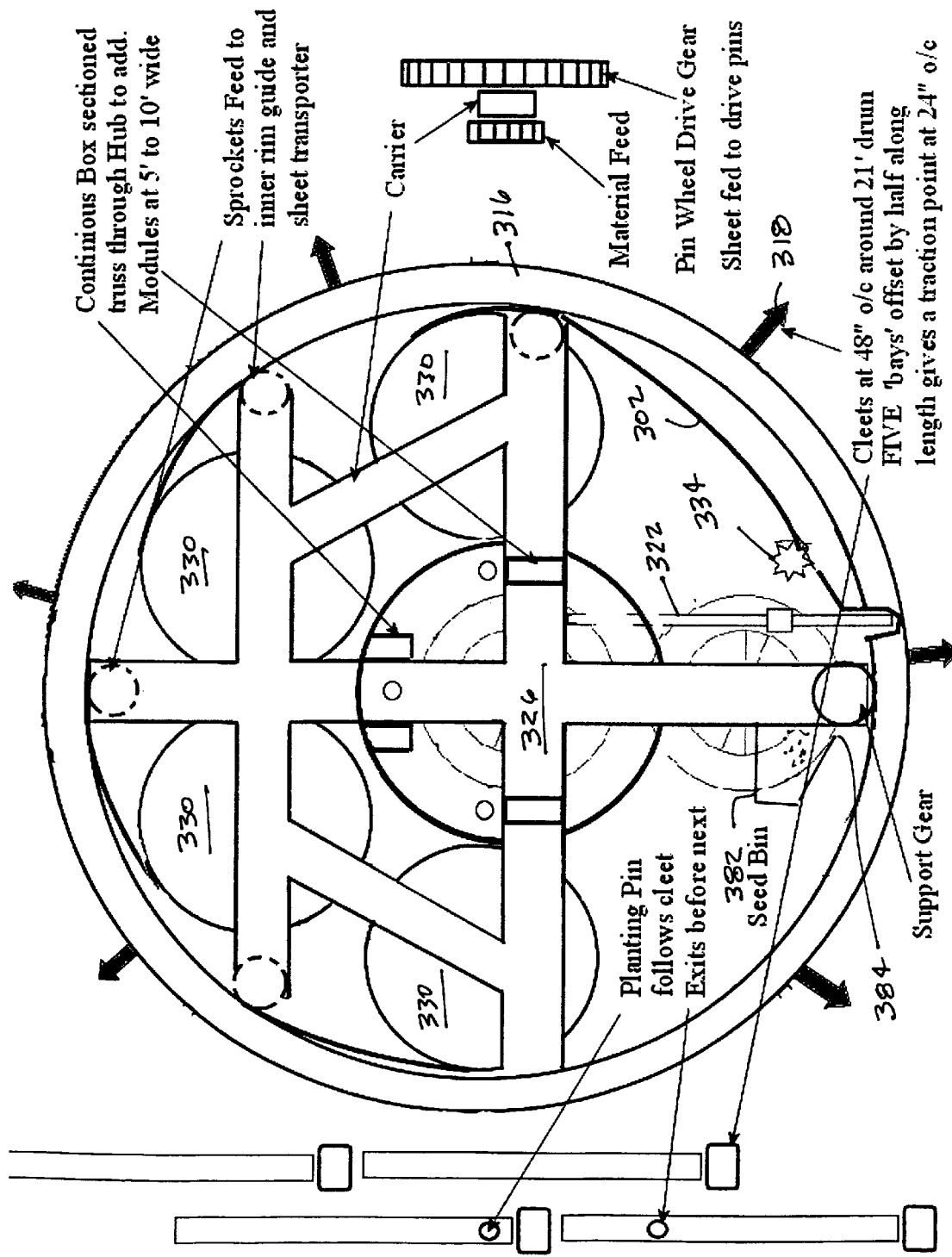
FIG. 25 is an end view of the installation apparatus of FIG. 23.

The installation apparatus 300 has an outer, cylindrical drum 316, as shown in FIG. 25. The diameter of the drum may vary, but typically would be in the range of 6 to 10 feet. The drum is of a heavy duty material such as a high quality steel. A plurality of projection feet or cleats 318 extend from the surface of the drum at spaced-apart locations at selected positions to penetrate surface prior or ahead of the installation of the individual substrate sections. Typically on a drum having a circumference of 20 feet, the cleats would be spaced approximately 48 inches on center. Extraction slots 320 extend across the width of the drum and are brought into alignment with the extraction pins 322.

Figure 29:
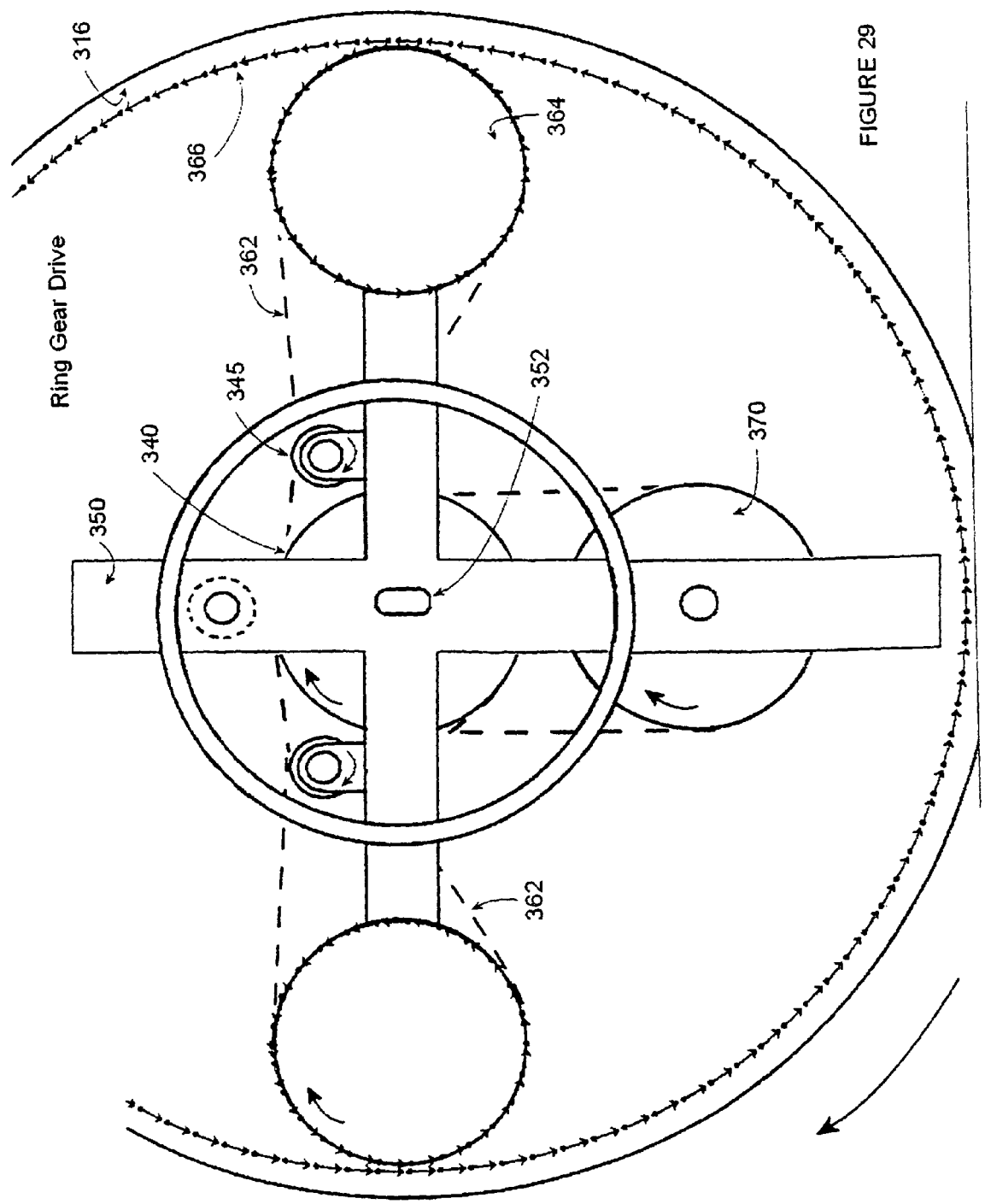
FIG. 29 is a partial end view of the substrate supply rolls and the associated drive mechanisms.

The pinion gears 364 shown in FIG. 29 mesh with the internal drum ring gear 366. A chain 362 passes to a sprocket 345 providing a gear reduction to each pin wheel. The drive wheel and the drive wheel cam are preferably all driven from the rotation of the drum to provide synchronous speed control. An increase or decrease in the speed, the drum is advanced, will be inherently reflected in the cycle speed of the drive pins.

The drum is advanced over the ground surface in the area to be implanted with the sections. The drum 316 may be a mobile unit with its own power source, but preferably has a tow bar 324 extending from the carrier supports 326 at either side of the drum. The tow bar may be attached to an appropriate towing vehicle such as a tractor or even drawn by a cable. A structural truss 392 extends axially between the end carriers 326.

Figure 26:
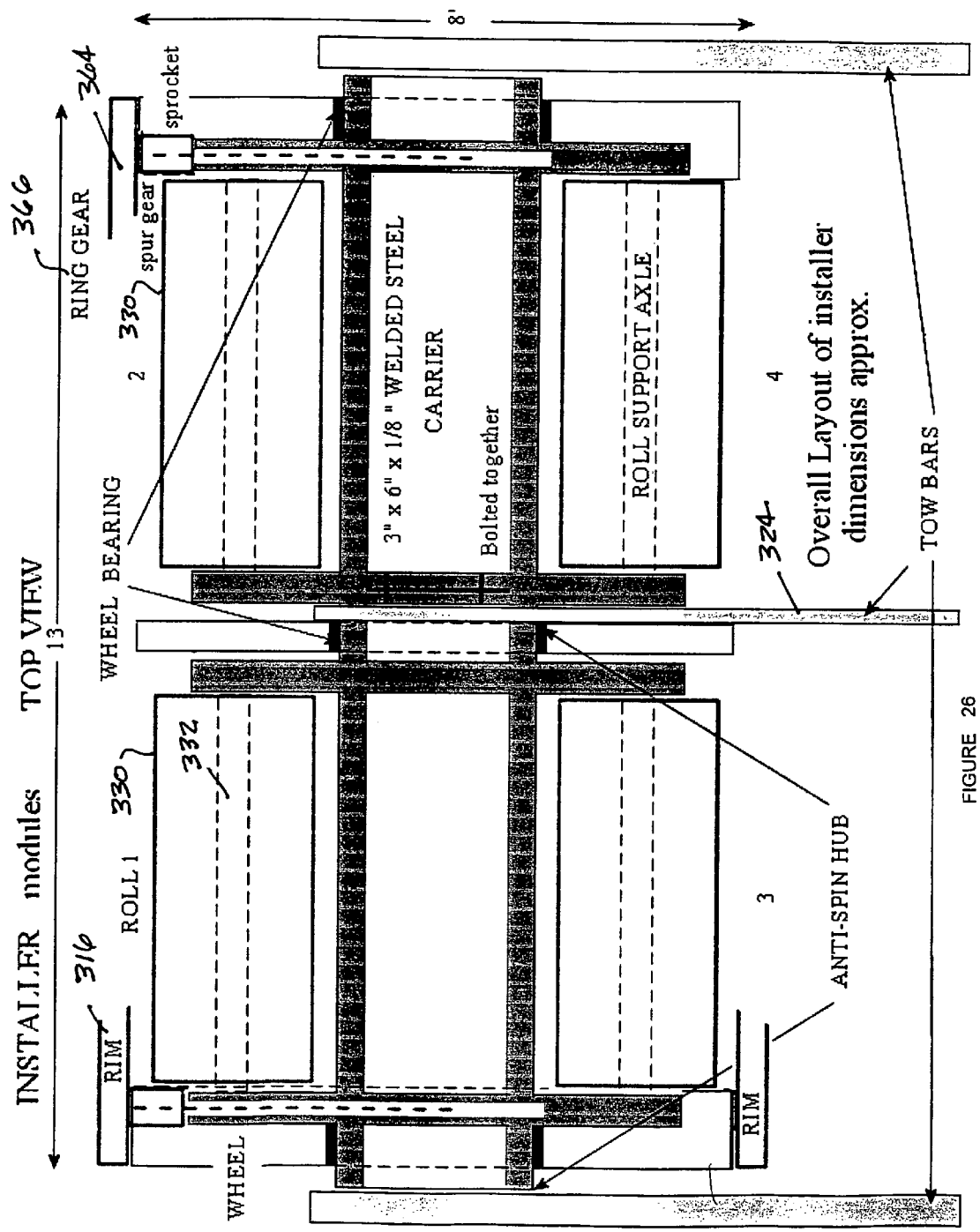
FIG. 26 is a plan view of the installation apparatus, broken away to better illustrate components.
Figure 30:
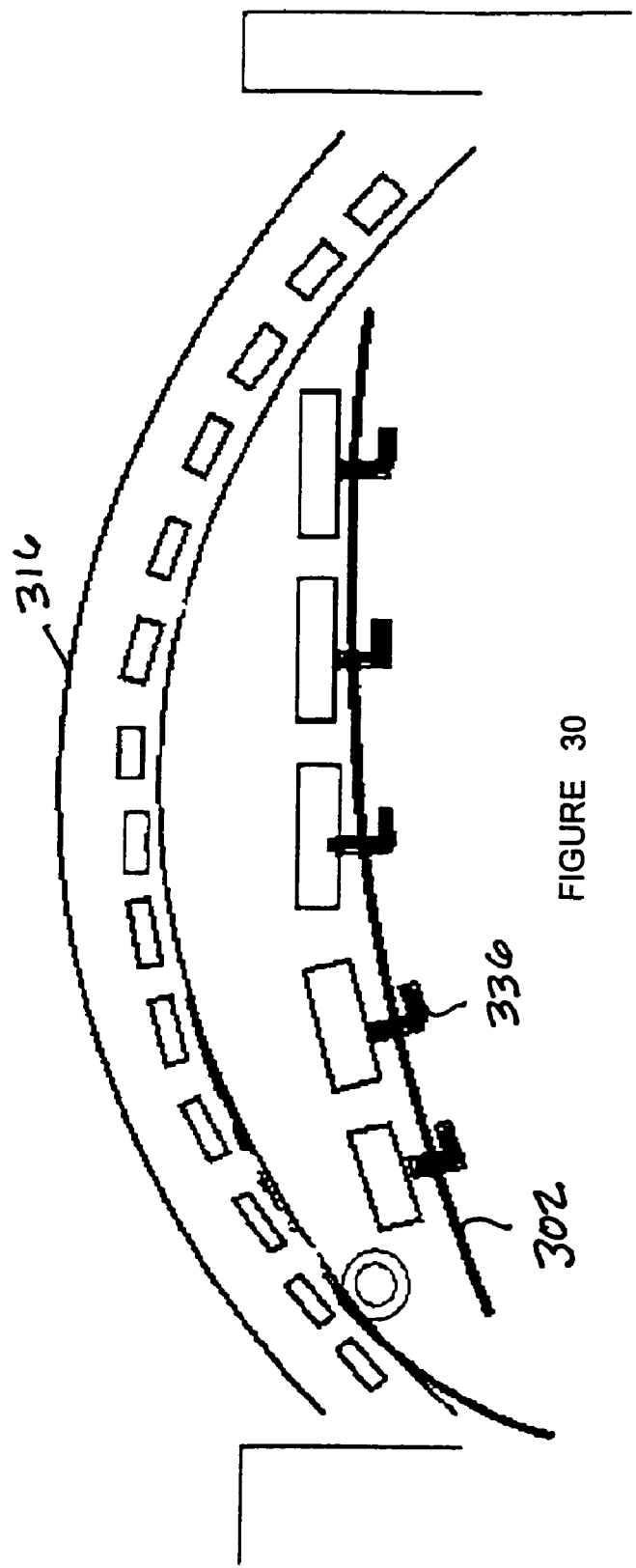
FIG. 30 is a detail view of the transport pins which advance the substrate.
Figure 31:
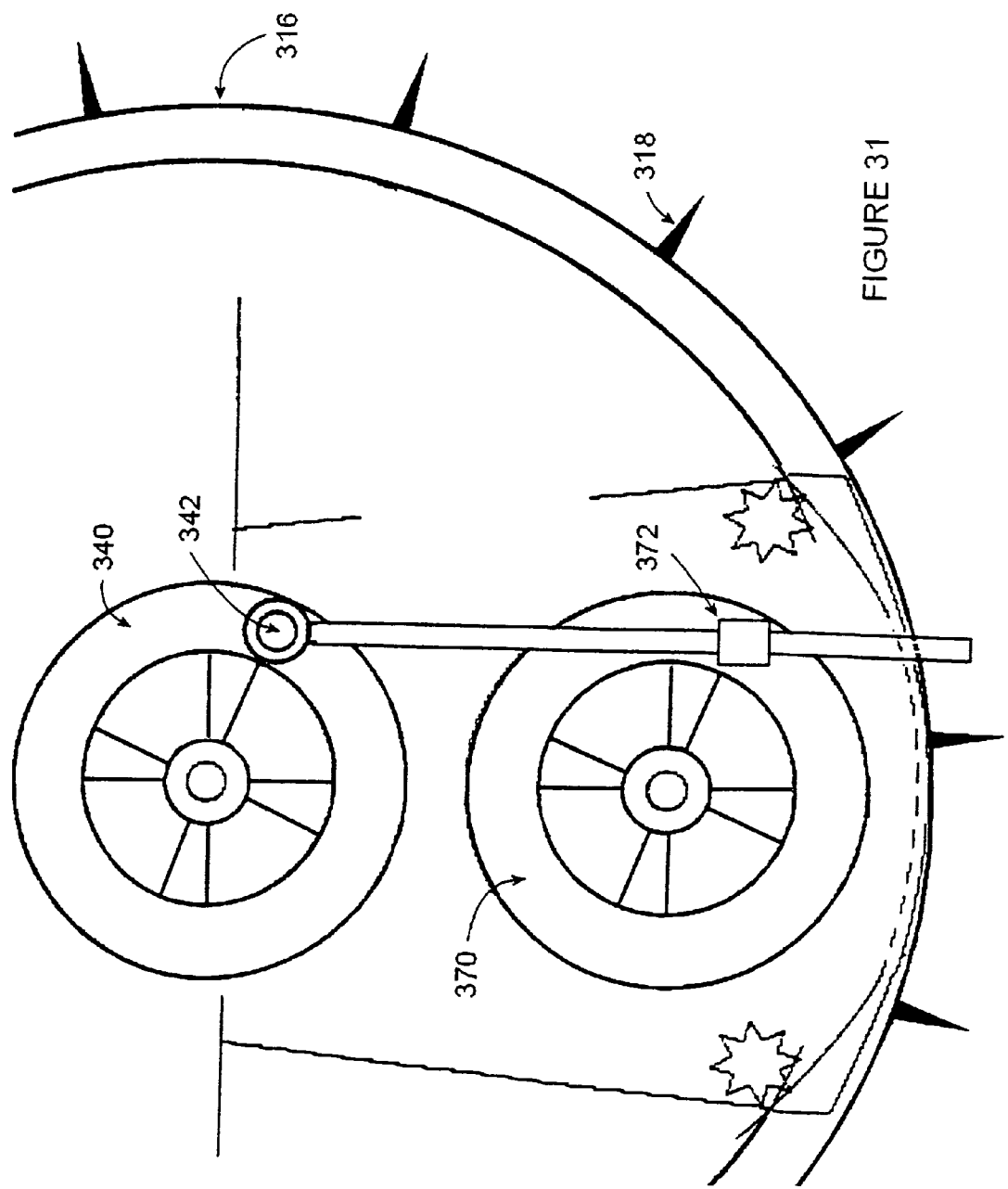
FIG. 31 is an end view of the drum showing the drive pin, drive wheel and the guide wheel.

A plurality of rolls 330 of substrate material, as seen in FIGS. 25 and 26, are shown supported on spindles or shafts 332 and extend parallel to the axis of the drum. As mentioned above, the material has a plurality of perforations 312 and the material is advanced by a sprocket 334. A plurality of L-shaped carriers 336 extend from the inside of the drum and are engageable in the apertures in the substrate to transport the substrate along the interior surface of the drum, as seen in FIG. 30.

The extraction slots 320 are provided as planting openings through which the sections are passed as they are extracted from the substrate 302 by reciprocating and impacting drive pins 322. The cleats 318 adjacent the slots 320 will penetrate the soil in advance extraction so that an initial depression is established in the soil. The drive pin will then position the extracted substrate section in the depression and further drive the extracted section to a greater depth such as 12 to 18 inches into the soil.

Figure 27:
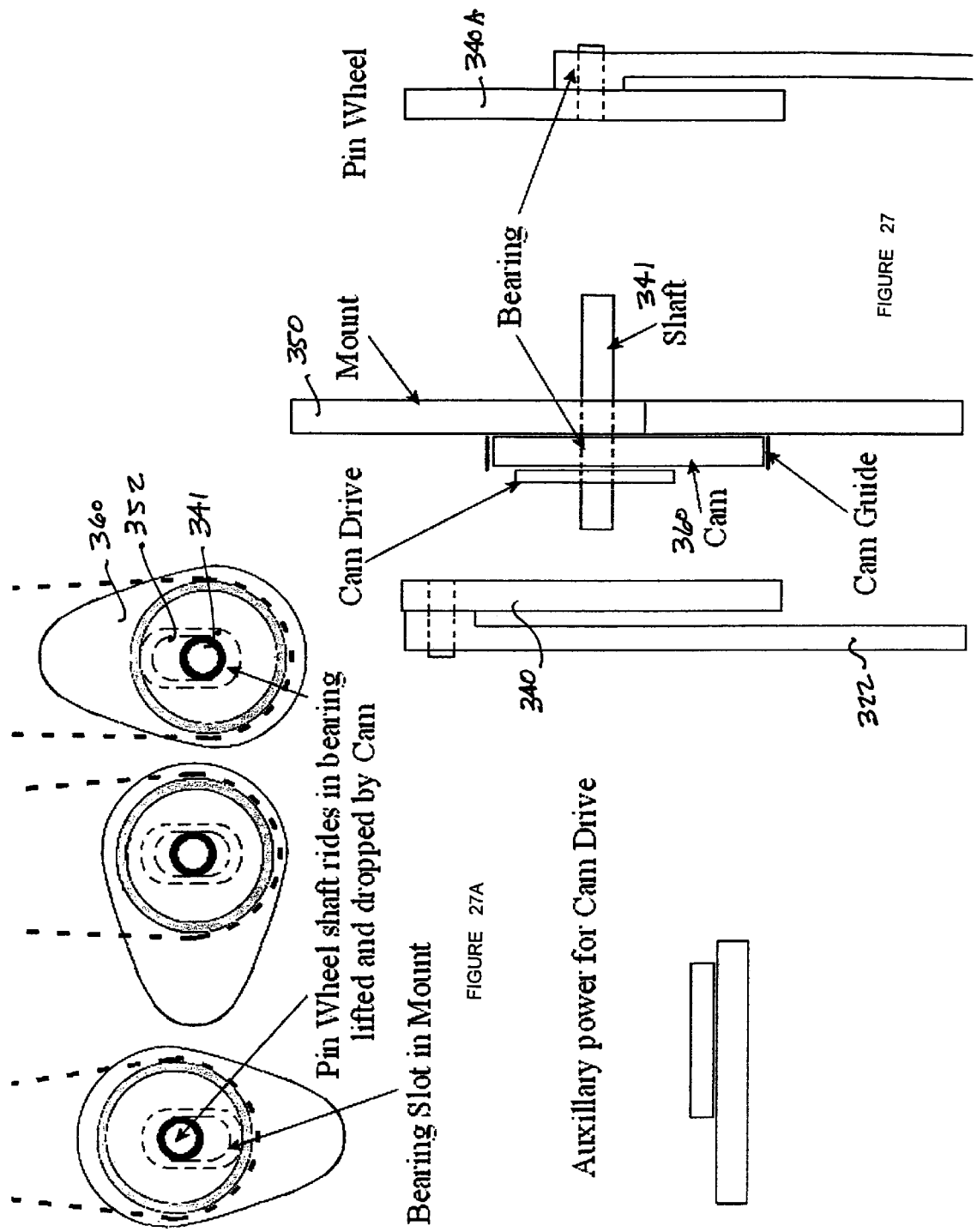

As seen in FIGS. 27 and 27A, the sections are extracted by a drive pin 322 which has a pair of pin wheels 340, 340A mounted on a common shaft 341. One pin wheel 340 carries a pivot 342 at a peripheral location to which is attached a downwardly extending drive pin. The opposed pin wheel 340A also has a pivot shaft 342A mounted at a peripheral location which is disposed 90° from the location of the pivot on the opposed pin wheel.

Figure 28:
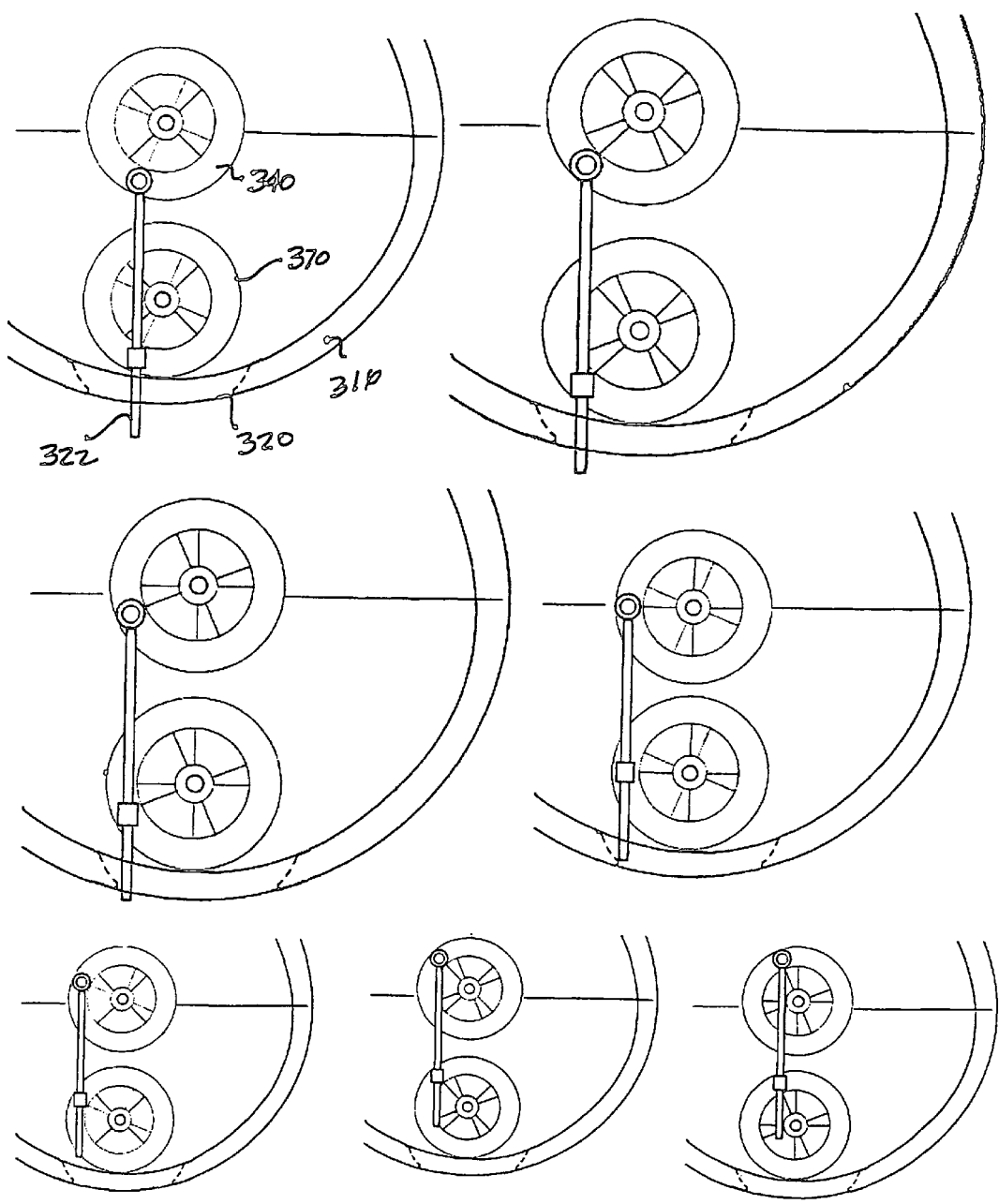
FIG. 28 illustrates the sequence of operation that occurs during the extraction and implanting of substrate sections.

A bearing plate 350 is secured to a fixed mount. The bearing plate defines a vertically extending slot 352 which houses a journal bearing 372. The pin wheel shaft 354 rides in the bearing as shown in FIG. 27A. A cam 360 is rotated by power transmission means which may be a gear or, as shown, a chain drive 362 which is driven from a pinion gear 364 which engages a ring gear 366 extending peripherally along the internal diameter of drum 316. Thus, it will be seen as the pin wheel shaft is rotated, the drive wheels will rotate reciprocating the drive pins 322. The reciprocation path of the drive pins is shown in FIG. 28. It will be noted that the drive pins are aligned with the substrate as it passes across extraction slots 320. The drive pins will enter the slot and, as the drum advances, the pins stroke will reach its maximum depth at the center of the opening. At this point, the substrate section 302 has been fully extracted from the sheet and has been inserted into the soil at a predetermined depth. As the drive pin passes the center of the opening, the drive pin will retract and return to its initial position as the next adjacent opening comes into alignment with the drive pin.

The drive pin on the opposite drive wheel will be 90° out of phase and will extract the next adjacent section of the substrate.

In order to maintain proper alignment of the stroke of the drive pin, a guide wheel 370 is associated with each pin. The guide wheel carries a journal bearing 372 through which the drive pin passes. The guide wheel is rotatively driven at the same speed and is in synchronization with the speed of the drive wheel.

The drive wheels ride in bearings 372 in the cam slot which imparts an impacting motion to the stroke of the drive pin. The pin wheel shaft is lifted and dropped by the cam so that as the drive pin is extended it is also reciprocated to impart an impacting motion which will assist in separating and driving the substrate section into the soil.

The drive pin wheel "jumps" up and down as it strokes due to the impact cam. The chain drive provides clearance and necessary slack for operation. Conventional slack adjusters 390 are provided as seen in FIG. 29.

Each drum 316 may contain a plurality of individual drive modules, as described above, and as seen in FIGS. 23 and 24. The drive modules are commonly arranged on the central drive shaft, positioned adjacent one another. The width of the substrate is selected in accordance with the size of the unit and the number of drive modules.

For strength and for access to the interior, a continuous box section truss 380 may extend to a hub particularly in units having a greater width of perhaps up to 10 feet. The speed of the drive wheel and guide wheel, as well as the speed of the carrier which advances the substrate, is synchronized with the speed of the drum.

FIG. 25 shows an auxiliary feed bin 382 which is an axially extending trough positioned in the lower part of the drum alignable with the planting openings as they pass across bottom dead center. The trough may be U-shaped or V-shaped having a plurality of openings or orifices 384 extending along the bottom edge of the trough. The trough contains a suitable particulate material such as seed or other material such as fertilizers, fire-retardants, soil additives or herbicides. The particulate material will be slowly dispersed over the surface of the substrate as it passes beneath the trough. The material will then flow or be deposited into the center portion of the extracted section as it is being extracted from the substrate. As the drive pin advances causing the extracted section to be implanted, the particulate material will be captured within the extracted section as it folds and will be implanted to the same depth as the extracted section. An extracted section may be in the configuration resembling blades of grass or may be any suitable shape or configuration lending themselves to compact die cut arrangement on a substrate and implantation in the manner described above.

EXAMPLE

The substrate sections may resemble native grasses. The substrate can be vegetable-based and completely biodegradable for reclamation, or may be non-degradable for fire resistant "no grow" areas around cars, large facilities and airports. Rolls of die cut plastic 5' wide 2000' long are loaded end to end and stacked double within a 7' diameter drum. As this 21' foot circumference is pulled behind a tractor it generates inertia. The force is transmitted through a transmission system utilizing gears, sprockets and chains. The apparatus is designed to move fast and in perfect synchronization. All mechanical motion of the pin wheels, guide wheels, sheet transporter and feed sprockets are locked to the rotational speed of the drum. Impact motions on the drive pin are created by a cam bearing in the pin wheel shaft spinning in an elliptical guide. The power may be hydraulic pressure from the tractor. Stability comes from the steel box section truss extending through all modules. The tow bars and support provide a stable platform from which the "plantings" are performed. Doubling of chain drives prove a redundancy factor. Seeds or particulates may be deposited along side the drive pin shaft as the sections are planted 12" into the ground. The drum cleats break the surface.

This arrangement of individual sections which may take the shape of artificial grass are defined by die cut or perforated edges allows dense and efficient installation by a drive mechanism having a plurality of aligned, spaced-apart drive pins or drills as will be explained hereafter. This arrangement permits a drive pin to engage the central body portion of a selected one of the individual blades and allowing it to pass through apertures in subjacent layers to be inserted into the ground.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A method of installing a ground cover over a soil surface comprising:
   (a) providing a substrate of flexible material having opposite side edges and defining a plurality of extractable elongate sections in rows and columns;
   (b) providing an installation machine having a plurality of drive pins alignable with selected of said sections;
   (c) advancing said substrate assembly into alignment with selected of said drive pins;
   (d) extending said drive pins to extract selected blades from each substrate and driving them into said soil; and
   (e) retracting said pins.

2. The method of claim 1 wherein said drive pins are rotatable.

3. The method of claim 2 wherein the substrate is advanced after selected sections have been extracted to reposition the substrate relative to the drive pins.

4. The method of claim 3 wherein the substrate is wound onto a take up reel after extraction of the blades.

5. The method of claim 1 wherein said drive pins have spiral flights.

6. The method of claim 1 further including force sensing means associated with said drive pins to withdraw the pins of a predetermined penetration when resistance is encountered.

7. The method of claim 1 wherein each pin is associated with a sleeve which engages the substrate.

8. The method of claim 1 wherein said drive pins engage selected sections at an intermediate location along the section causing the sections to fold as they are installed.

9. The method of claim 1 wherein the drive pins are reciprocably impact driven.

* * * * *